United States Patent [19]

Demmel

[11] Patent Number: 5,422,332
[45] Date of Patent: Jun. 6, 1995

[54] PROCESSES FOR REACTING BASTNAESITE WITH METAL OXIDES

[75] Inventor: Edward J. Demmel, Newport Beach, Calif.

[73] Assignee: Intercat, Inc., Manasquan, N.J.

[21] Appl. No.: 99,828

[22] Filed: Jul. 30, 1993

[51] Int. Cl.$^6$ ............................................. B01J 20/04
[52] U.S. Cl. ..................... 502/414; 502/411; 502/415; 423/240.04; 423/244.07; 423/244.1
[58] Field of Search ............... 502/304, 303, 341, 340, 502/355, 524, 411, 414, 415; 423/244.07, 244.04, 244.11

[56] References Cited

U.S. PATENT DOCUMENTS

| | | | |
|---|---|---|---|
| 3,835,031 | 9/1974 | Bertolacini | 208/120 |
| 4,153,534 | 5/1979 | Vasalos | 208/120 |
| 4,153,535 | 5/1979 | Vasalos | 208/120 |
| 4,206,039 | 6/1980 | Vasalos | 208/120 |
| 4,218,344 | 8/1980 | Vasalos | 252/455 |
| 4,221,677 | 9/1980 | Vasalos | 252/455 |
| 4,233,276 | 11/1980 | D'Souza et al. | 423/230 |
| 4,238,317 | 12/1980 | Vasalos | 208/120 |
| 4,267,072 | 5/1981 | Vasalos | 252/455 |
| 4,311,581 | 1/1982 | Baron et al. | 208/115 |
| 4,325,811 | 4/1982 | Sorrentino | 208/113 |
| 4,341,661 | 7/1982 | Baron et al. | 252/455 |
| 4,366,083 | 12/1982 | Baron et al. | 252/416 |
| 4,369,108 | 1/1983 | Bertolacini et al. | 208/120 |
| 4,369,130 | 1/1983 | Bertolacini et al. | 252/455 |
| 4,381,991 | 5/1983 | Bertolacini et al. | 208/113 |
| 4,405,443 | 9/1983 | Bertolacini et al. | 208/113 |
| 4,423,019 | 12/1983 | Bertolacini et al. | 423/244 |
| 4,471,070 | 9/1984 | Siefert et al. | 502/302 |
| 4,497,902 | 2/1985 | Bertolacini et al. | 502/65 |
| 4,642,177 | 2/1987 | Mester et al. | 502/332 |
| 4,686,204 | 8/1987 | Mester et al. | 502/406 |
| 4,728,635 | 3/1988 | Bhattacharyya et al. | 502/304 |
| 5,108,979 | 4/1992 | Magnabosco et al. | 502/304 |

*Primary Examiner*—Anthony McFarland
*Attorney, Agent, or Firm*—Dorr, Carson, Sloan & Birney

[57] ABSTRACT

Bastnaesite materials and Mg[A] (and/or Al[B]) materials can be chemically reacted by use of reactions wherein a Al[B] ingredient such as alumina is made into a sol by use of a mono-protonic acid before Mg[A] (and/or Al[B]) materials is (are) reacted with the bastnaesite material.

46 Claims, 5 Drawing Sheets

Fig. 2

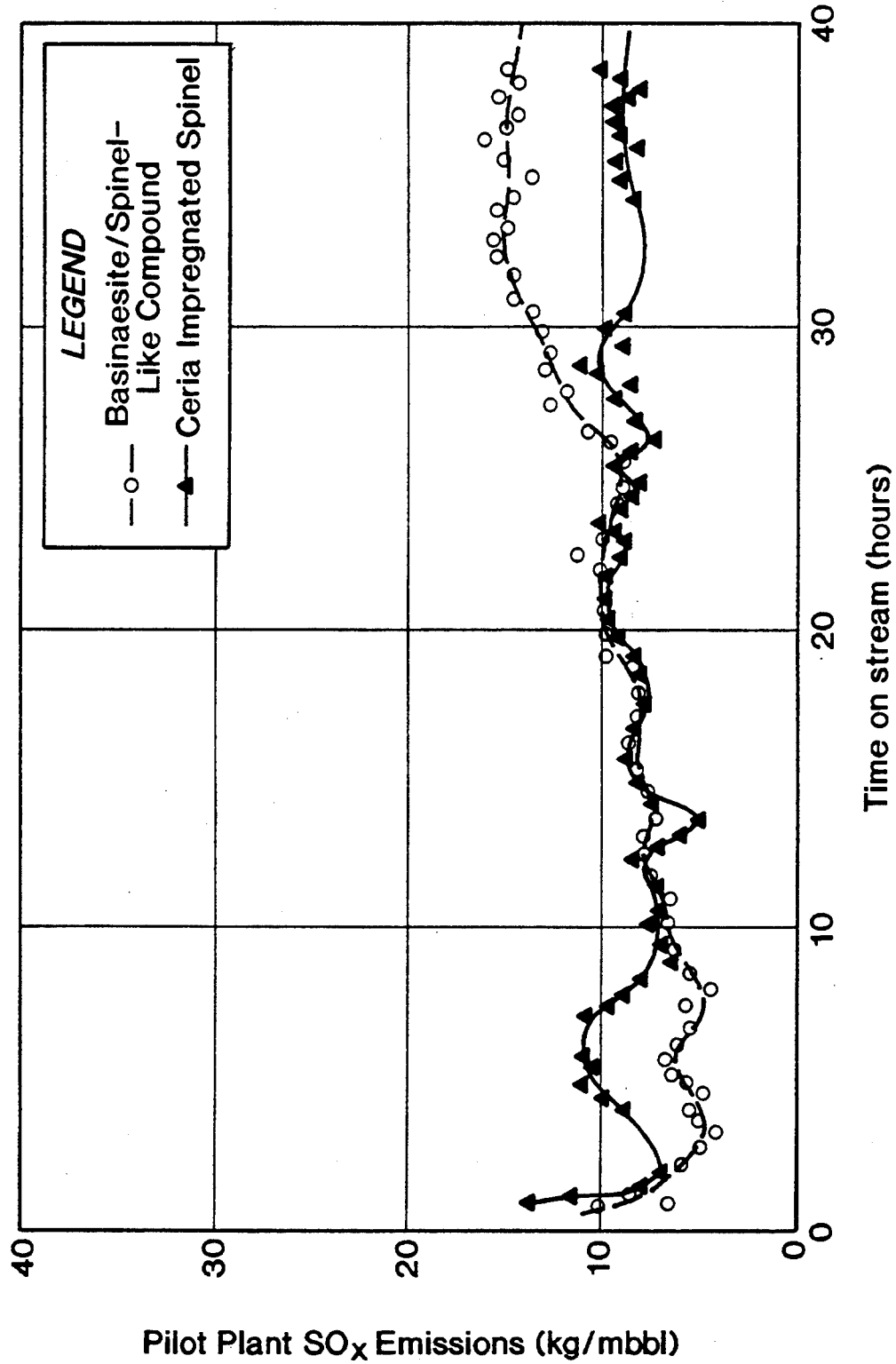

PROCESSES FOR REACTING BASTNAESITE WITH METAL OXIDES

FIELD OF THE INVENTION

This invention is generally concerned with chemically reacting bastnaesite with bivalent and/or trivalent metal oxides such as those which are typically used in making synthetic spinels, especially those synthetic spinels which are used as $SO_x$ absorbent/catalyst materials.

BACKGROUND OF THE INVENTION

Re: Bastnaesite

Generally speaking, the term "bastnaesite" denotes a group of minerals which can be regarded as being comprised of fluorocarbonates of certain rare earth metals. However, the nomenclature used to describe such materials is often rather vague. For example, since the chief components of bastnaesite are the "rare earths" such materials are sometimes referred to as rare earth oxides. These materials also are commonly referred to as "lanthanides". This term is obviously a corruption of the word lanthanum, which of course is the first member (or lowest atomic number member) of the lanthanide group in the periodic table. Those familiar with this art also will appreciate that it is not at all an uncommon practice to use the symbol for the lanthanides ("Ln") to generally denote all of the lanthanides when they are considered as a group. Similarly, it also is common practice to refer to the various oxides of the entire lanthanide group as LnO—and to their oxyflourides as LnOF. Given all of these considerations, it is quite common to designate the chemical makeup of bastnaesites, in general, by the formula: (Ce,La)OF, even though such materials contain many other elements. For example, mineral bastnaesite contains from about 65 to about 80% by weight of assorted rare earth elements (calculated as rare earth oxides) with its primary metallic components being lanthanum and cerium. This fact explains the widespread use of (Ce,La)OF as the chemical formula for these materials. However, bastnaesite minerals almost always contain small proportions of various other rare earth elements such as praseodymium, neodymium, samarium, europium, and gadolinium. For example, chemical analysis of a typical bastnaesite mineral might show proportions of individual rare earth elements (calculated as oxides) to the total rare earth elements (also calculated as oxides) which fall within the general ranges: 45 to 55 wt. % $CeO_2$, 29 to 35 wt. % $La_2O_3$, 11 to 15 wt. % $Nd_2O_3$, 2.5 to 5.5 wt. % $Pr_2O_3$, 0.3 to 0.7 wt. % $Sm_2O_3$, 0.1 to 0.3 wt. % $Gd_2O_3$, 0.05 to 0.15 wt. % $Eu_2O_3$ and 0.05 to 0.35 wt. % of other rare earth elements.

Next, it should be noted that bastnaesite is a somewhat chemically reactive mineral. Consequently, it can be modified by relatively moderate chemical and/or physical treatment processes such as steaming, calcining and acid leaching. For instance, when naturally occurring bastnaesite is calcined in air at a temperature around 700° C., it undergoes a chemical reaction wherein some of its rare earth fluoro-carbonates are converted to rare earth oxyfluorides. By way of another example of such modifications, mineral bastnaesite can be leached with certain strong acids in order to withdraw its strontium and barium content. Be all of this as it may, this invention contemplates use of either naturally occurring forms of bastnaesite or any number of chemically and/or physically treated forms of that mineral. Hence, for the purposes of this patent disclosure, the terms "bastnaesite" "treated bastnaesite" "bastnaesite mineral(s)", "bastnaesite-like materials" etc. should be taken to include not only those raw mineral forms of bastnaesite found in nature, but also a wide variety of physically or chemically treated forms of bastnaesite minerals—indeed, for the purposes of this patent disclosure, these terms should even be taken to include any synthetic material having a distribution of rare earth elements to total rare earth elements substantially similar to those of naturally occurring bastnaesite minerals.

Catalytic Uses Of Bastnaesite

Bastnaesite has an initial ability to chemically react with $SO_x$ under those conditions existing in a catalyst regeneration zone of a fluid catalytic cracking ("FCC") unit. Consequently, bastnaesite has been physically associated with various hydrocarbon cracking catalysts in order to catalyze the oxidation of $SO_x$ produced by regeneration of various hydrocarbon cracking catalysts. Bastnaesite also has the ability to absorb $SO_3$ gas. For example, U.S. Pat. Nos.: 4,366,083 (the 083 patent); 4,311,581 (the 581 patent) and 4,341,661 (the 661 patent) teach $SO_x$ catalytic and/or absorbance activity of bastnaesite particles which are circulated in physical admixture with various hydrocarbon cracking catalysts. However, bastnaesite compositions have not been widely used as $SO_x$ additive materials because there are far better $SO_x$ catalyst materials (e.g., ceria, vanadia, etc.) and because bastnaesite is not a good long term absorbent because it is not easily regenerated under those conditions found in a fluid catalytic cracking unit or its catalyst regenerator unit. That is to say that bastnaesite will readily pick up $SO_3$ gas during the bastnaesite's first trip through the FCC unit, but that the $SO_3$ is not readily driven away from the bastnaesite during subsequent regeneration steps. Consequently, large initial amounts of bastnaesite (e.g., 15% of the bulk catalyst) must be used in the unit's bulk catalyst in order to maintain the ability of such processes to absorb $SO_3$ gas—and the bastnaesite supply must be continuously augmented. The latter procedure involves the use of large quantities of bastnaesite in the "make-up" catalyst which is intermittently supplied to the FCC unit. The resulting large proportions of non-hydrocarbon cracking catalytic material tend to destabilize the overall catalytic process being carried out in a FCC unit. Consequently, other materials which can be readily "regenerated" (e.g., alumina, ceria, lanthanum, etc. and alumina support materials impregnated with ceria, lanthanum, etc.) have been used in preference to bastnaesite for $SO_3$ absorption purposes.

None of the above references, however, teach methods whereby bastnaesite can be chemically reacted with those hydrocarbon cracking catalyst materials with which they are physically mixed. That is to say that under the broadest teachings of the 083; 581 and 661 patents, bastnaesite can be employed in either of two ways: (1) bastnaesite particles can be admixed with separate and distinct hydrocarbon cracking catalyst particles—that is to say that the bastnaesite particles and the hydrocarbon cracking catalyst particles become thoroughly mixed as they are circulated through a FCC unit—but they remain in the form of separate and distinct particle species or (2) bastnaesite particles can be physically incorporated into matrices which are comprised of both hydrocarbon cracking catalyst particles and bastnaesite particles—that is to say that these two different kinds of particles are "glued" together by the use of binder materials in order to form a composite particle. For example, the 083; 581 and 661 patents teach that crystalline aluminosilicate zeolite hydrocarbon cracking catalysts can be "glued" to bastnaesite particles through the use of an inorganic refractory oxide binder material. In other words, the bastnaesite particles are physically dispersed in an overall particle whose matrix is comprised of bastnaesite particles, aluminosilicate zeolite particles and the matrix binder material.

Re: Metal Oxide Materials

Various metal oxide materials such as those described in U.S. Pat. Nos. 4,381,991 (the 991 patent) and 4,369,130 (the 130 patent) have been employed as $SO_x$ absorbent/catalyst materials. In most cases these materials are bivalent and/or trivalent metal oxides such as those of the alkaline earth metals. When bivalent and trivalent oxides-such as those described in the 991 patent are combined with each other, the resulting materials are sometimes considered to be a distinct group of metal oxides commonly referred to as "spinels" or synthetic spinels. Indeed, the term "spinel" is often loosely used to describe a wide variety of minerals having certain metal oxide ingredients. It is also true that many metal oxide materials which could be called "spineis" are not designated by use of this term. For example, the materials produced by the process described in Example 10 of the 991 patent (at Column 22, Line 53), could legitimately be called synthetic spinels even though the term "spinel" is not specifically used in that patent disclosure.

The term "spinel" is also used to describe a variety of naturally occurring minerals which contain various combinations of two or more metal oxides wherein the metals have different valances. A more precise use of the term also implies metal oxide materials (mineral or synthetic) crystallized in an isometric system with an octahedral habit. Spinels are also often thought of as combinations of bivalent and trivalent oxides of magnesium, zinc, cerium, lanthanum, iron, manganese, aluminum, and chromium. Some of the more important mineral forms of spinel are spinel ($MgAl_2O_4$), gahnite, zinc spinel ($ZnAl_2O_4$), franklinite ($Zn,Mn^{2+}$, $Fe^{2+}$) ($Fe^{3+},Mn^{3+})_2O_4$, and chromite ($FeCr_2O_4$). Spinels, in general, are frequently designated by the general formula: $R^{2+}O\ R_2^{3+}O_3$ wherein R is a metal having a valance of plus two and $R_2$ is a metal having a valance of plus three. For the most part, the bivalent oxides are MgO, ZnO, FeO, and MnO. The trivalent oxides are typically $Al_2O_3$, $Fe_2O_3$, $Mn_2O_3$, $La_2O_3$, $Ce_2O_3$ and $Cr_2O_3$. Of these materials, $MgAl_2O_4$ is the most important—indeed the term "spinel" is often taken to mean the magnesia/alumina ($MgO/Al_2O_3$) form of these materials.

In another sense, spinels may be thought of as being comprised of a first metal having a first oxidation state and a Second metal having an oxidation state higher than that of the first metal and wherein each metal is appropriately associated with oxygen in a lattice structure. The first and second metals may even be the same metal. In other words, the same metal may exist in a given spinel in two or more different oxidation states. It also should be understood that the atomic ratio of the first metal to the second metal in any given spinel need not be consistent with the classical stoichiometric formula for the various components of a given spinel. Thus, in an even broader sense, spinels may be thought of as being composed of bivalent and trivalent metallic oxides of continuously varying proportions i.e., materials having the general formula: $nR^{2+}O\ mR^{3+}O_3$ wherein the ratio of n to m may vary. Those skilled in this art will appreciate that continuously variable ratios of atoms is a common occurrence in those materials known as "solid solutions."

Catalytic Uses of Metal Oxide Crystals

Metal oxide crystals such as those commonly referred to as spinels have been employed as catalysts in petroleum refining operations for almost 50 years. However, it is of considerable importance to a proper understanding of the scope of this patent disclosure to recognize that the use of such materials for catalytic purposes has had an "up and down" evolutionary development. Originally, mineral spinels were used as catalysts for cracking crude petroleum into various refined products. The use of mineral spinels eventually led to the use of certain synthetic spinels. Both kinds of spinel (naturally occurring and synthetic) were so employed because they each have relatively large numbers of catalytically active acid sites distributed over their extensive, porous surfaces. The petroleum industry also learned to "tailor" various synthetic spinels for certain very specific purposes. For example, spinel matrices with an excess of alumina were developed for use in certain fluid catalytic cracking operations because these materials tend to have a durable, attrition-resistant character. This attribute follows from the fact that trivalent aluminum oxide, the mineral corundum (in its natural state), is extremely hard—indeed, it is right next to diamond on Mohs' scale of hardness.

Use of naturally occurring and synthetic spinels as petroleum cracking catalysts was, however, eventually phased out when petroleum cracking was realized through other, more catalytically active, materials such as crystalline aluminosilicate zeolites. This phasing out of spinels also was forced by purely physical considerations. For example, those MS-FCC catalysts (microspheroidal, fluid catalytic cracking catalysts) which are used in modern petroleum cracking operations must be substantially spherical in form. They also must be made in a rather narrow range of sizes and densities so they can achieve uniform fluidization. It might even be said that FCC catalysts must be made with almost as much attention paid to their size, shape and density as to their chemical composition.

Unfortunately, these physical requirements produced several problems with respect to the use of spinels in FCC units. Most of these problems revolved around the fact that spinels in general, and naturally occurring spinels in particular, are not of suitable size, shape, and/or density for use in fluidized processes. Consequently, they were easily elutriated from an FCC unit. Such elutriation losses were very considerable—and very costly. On the other hand, when spinels were physically bound in those matrix-forming materials normally used to create FCC particles, the spinels tended to become much less effective as hydrocarbon cracking catalysts. In any event, the above-noted catalytic and physical drawbacks prodded the petroleum refining industry into developing more effective FCC catalysts (e.g., aluminosilicate zeolites). They were successful in these endeavors and, in time, spinels virtually disappeared from the petroleum cracking scene.

Interest in the use of certain crystalline metal oxides (such as spinels) as catalysts has, however, revived in more recent times. This newfound interest follows from the fact that such materials, aside from their petroleum cracking capabilities, also can be used to lower the concentrations of those noxious sulfur oxides ($SO_x$), e.g., $SO_2$ and $SO_3$, which are emitted in the course of burning and/or catalyzing sulfur-containing fossil fuels and/or regenerating carbon and sulfur-contaminated hydrocarbon cracking catalysts.

In this regard, it also should be specifically noted that spinels, in their own right, possess some $SO_x$ catalytic activity; but they are even more effective as $SO_3$ absorbents. That is to say that spinels—aside from whatever $SO_x$ catalytic activities they may possess—also have the separate and distinct ability to absorb sulfur trioxide. These distinctions are noteworthy because in order to recover sulfur from a sulfur oxide-containing gas, its $SO_2$ content first must be converted to $SO_3$. It is only after the $SO_2$ is converted to $SO_3$ that the $SO_3$ can be picked up by an $SO_x$ absorbent—which for the most part is a $SO_3$ absorbent. This follows from the fact that there are no economically suitable materials which are capable of effectively absorbing $SO_2$ gases. There are, however, several economically viable materials, including spinels, which are capable of absorbing $SO_3$ gases. Hence, the $SO_2$ content of a gas stream must be oxidized to $SO_3$ so that the $SO_3$ can be picked up by an absorbent. In other words, it is only after the $SO_2$ is converted to $SO_3$ that the undesired sulfur content of a gas stream can be removed. Consequently, spinels have been physically associated with various $SO_x$ catalysts (e.g., cerium and/or vanadium) in order to perform the required $SO_3$ absorption function. In other words, it is usually the separate and distinct $SO_x$ catalyst species (e.g., cerium and/or vanadium) which, for the most part, serves to catalyze the oxidation of sulfur dioxide to sulfur trioxide, while spinel serves mostly to absorb the sulfur trioxide once it is formed through the use of such cerium or vanadium $SO_x$ catalyst materials.

Next, it should be noted that in the course of manufacturing various crystalline, metal oxide materials (such as spinels) by most prior art methods, certain chemical reactions readily take place wherein various complex compounds e.g., magnesium oxide (MgO), stoichiometric spinel ($MgAl_2O_4$) etc. are formed. In most prior art processes, these complex compounds are loosely distributed throughout a crystalline matrix of an excess of one of the spinel's ingredients (e.g., in an alumina matrix of a magnesia/alumina spinel). To emphasize this point, applicant has chosen to describe and characterize that MgO which is "loosely" distributed in a spinel (i.e., MgO which does not form a part of a spinel's crystalline lattice structure), by use of the expression "free magnesium oxide." For the purpose of this patent disclosure, all such excess compounds (e.g., free magnesium oxide, stoichiometric spinel, etc.) also may be referred to as "free, complex metal oxides".

Regardless of terminology however, this loose distribution of free complex metal oxides is known to impart certain properties to the resulting materials. For example, within the catalyst regeneration arts, it has long been recognized that the presence of large amounts of loosely distributed MgO in spinels can enhance their $SO_x$ absorbent and/or $SO_x$ catalytic abilities. However, practitioners of these arts soon learned that when increased $SO_x$ activity was pursued by creating magnesia/alumina spinels which are characterized by the presence of excess MgO, the hardness of the resulting spinel is greatly diminished. This follows from the fact that MgO is not nearly as hard as, and hence not nearly as attrition resistant as, alumina. Consequently, under the severe attrition and impingement conditions which are encountered in fluidized beds, the prior art experienced unacceptably severe and rapid breakage (and hence loss) of those MS-FCC synthetic spinel particles which contain relatively large amounts of "free magnesium oxide".

Nonetheless, all such drawbacks notwithstanding, it should be noted that any in depth review of the prior art literature dealing with the use of mixtures of two or more metal oxides in a crystalline lattice material (acting in the capacity of $SO_x$ catalysts and/or absorbents), reveals that a "school of thought" among many workers skilled in this art has persistently held that the presence of such complex compounds (e.g., complex metal oxides such as free magnesia, stoichiometric spinel, etc.) is an ineluctable—and even highly desirable—attribute of these materials. See, for example U.S. Pat. No. 4,728,635 (the 635 patent) at column 4, line 31 where use of up to 30% of such free magnesia is advocated.

Applicant, however, very decidedly belongs to an opposing school of thought which holds that the presence of "free" complex metal oxides such as free magnesium oxide, is an inherently "undesirable" attribute for those spinel or spinel-like materials used as $SO_x$ absorbent/catalyst materials—and should be avoided as much as possible. That is to say that applicant is of the opinion that the $SO_x$ absorbent and/or catalyst performance of the herein described bastnaesite/metal oxide materials can be enhanced if any excess (amounts in "excess" of that implicit in the stoichiometric formula) magnesium oxide is present as a part of a solid solution in that material's "magnesium rich" homogeneous crystalline structure—as opposed to being present in the form of "free" magnesium oxide which is not so associated with that material's metal oxide crystalline structure.

However, it also should be noted that applicant may not be entirely alone in some of his beliefs concerning the $SO_x$ catalyzing properties resulting from the manner in which magnesium oxide is associated with a spinel's other chemical constituents. For example, U.S. Pat. No. 4,471,070 ("the 070 patent") teaches various methods of making synthetic spinels wherein the atomic ratio of magnesium to aluminum is purposely held to a range of 0.17 to 1.0 in order to enhance the resulting spinel's $SO_x$ catalytic activity. The point to be made here is that the 0.17 to 1.0 ratios could imply "magnesium rich" spinels if the magnesium to aluminum ratio is greater than 0.5 to 1.0. It also should be noted that the 635 patent, in spite of its previously cited preference for the presence of free alkaline earth metal oxides such as MgO, also teaches methods of making spinels wherein the ratio of alkaline earth metal (e.g., Mg) to aluminum is made to fall between 0.17 and 2.5. Thus, in effect, the 635 patent teaches methods for making spinels which have both "excess" magnesium oxide as part of their lattice structures—while simultaneously, having "free" magnesia otherwise associated with that same spinel. Thus, in spite of the 635 patent's stated preference for the presence of free magnesium oxide, its spinels also could be characterized (using applicant's terminology), as "magnesium-rich" spinels in those cases where the material's magnesium to aluminum ratio is greater than 0.5 to 1.

On another front, the prior art with respect to the catalytic uses of crystalline metal oxide materials has long recognized that certain metal ions, such as those of iron, chromium, vanadium, manganese, gallium, boron, cobalt, Group IB metals, cerium Group IV metals, Group VA metals, the platinum group metals, the rare earth metals, Te, Nb, Ta, Sc, Zn, Y, Mo, W, Tl, Re, U, Th and mixtures thereof, may replace all or part of the aluminum ions of certain spinels. In somewhat the same vein, the prior art also has taken advantage of the fact that $SO_x$ can be removed from gases by various metal oxide absorbents when these materials are placed in association with at least one free or combined rare earth metal selected from the group consisting of lanthanum, cerium, praseodymium, samarium and dysprosium. For example, it is well known that crystalline metal oxides and magnesium/aluminum spinels in particular, can be physically associated with various catalytically active metals by impregnating their particles with certain metal-containing solutions (e.g., those of cerium, vanadium, platinum, etc.) and then calcining the resulting impregnated spinel particles and thereby producing even more effective $SO_x$ catalysts.

Indeed, it might even be said that, to a very large degree, the prior art with respect to using crystalline, metal oxide materials such as synthetic spinels as hydrocarbon cracking catalysts and/or as $SO_x$ absorbents (or catalysts) has largely focused upon finding better ways of associating various catalytically active materials (e.g., cerium, vanadium, etc.) with all manner of such crystalline metal oxide materials in order to enhance the resulting material's $SO_x$ absorbing (or catalyzing) capabilities. Representative patents teaching such technologies include U.S. Pat. Nos. 4,381,991; 4,497,902; 4,405,443; 4,369,130; 4,369,108; 4,233,276 and 4,325,811. Analogous $SO_x$ absorption technologies also are taught in U.S. Pat. Nos.: 4,423,019; 3,835,031; 4,153,534; 4,238,317; 4,267,072; 4,221,677; 4,218,344; 4,206,039 and 4,153,535.

As a final note regarding the prior art, applicant also would point out that the technology described in U.S. Pat. No. 5,108,979 ("the 979 patent") was developed in response to several of the above-noted problems associated with the use of crystalline metal oxide materials (e.g., spinels) as $SO_x$ absorbent/catalyst materials. Indeed, the teachings of the 979 patent represent a very convenient starting point for describing the present invention; hence, the 979 patent is specifically incorporated by reference into this patent disclosure. Among other things, the 979 patent teaches that production of various free complex metal oxide compounds such as free magnesium oxide and stoichiometric spinel can be avoided by manufacturing processes wherein substantially all of the ingredients (e.g., magnesia, alumina, etc.) are "forced" to become an integral part of the resulting material's regular crystalline lattice structure (as opposed to being only loosely associated with such crystalline structure). This forced residence in the crystalline lattices of these materials was accomplished in the processes described in the 979 patent by production processes involving the conjunctive use of extremely small sized ingredient materials (e.g., those smaller than 5 nanometers) along with the use of certain prescribed pH levels in their initial reaction mixtures.

As a follow-up to some of the experimental work which formed the basis of the technology described in the 979 patent, applicant embarked upon an expanded experimental program aimed at physically incorporating various density-imparting, but catalytically inert, ingredients into various spinel materials taught in that patent. A need for such measures arose because some of the spinels produced by the processes described in the 979 processes were not—in their own right—dense enough to achieve optimum fluidization in certain FCC operations. Consequently, various materials having densities higher than that of spinels were physically mixed with the spinel-forming ingredients in a unified matrix in order to raise the overall density of the resulting particles. To this end, bastnaesite was used as just such a density-raising material. In effect, the heavier bastnaesite particles and the lighter spinel particles were "glued together" in the form of a composite particle which is held together by one or more catalyst binder material(s) in order that the resulting composite particles have a density better suited for fluidization.

Among other things, applicant's experimental program with respect to physically mixing bastnaesite with various spinel-forming ingredients served to show that the physical presence of bastnaesite in a matrix of such materials does in fact raise the overall density of a FCC particle to desirable levels—but does not, per se, improve the efficacy of the resulting bastnaesite/spinel composite material as a $SO_x$ absorbent/catalyst. However, in seeking to find better ways of physically incorporating bastnaesite into such spinel matrix materials, applicant discovered certain processes whereby bastnaesite can be chemically reacted with the spinel-forming ingredients (e.g., alumina, magnesia, etc.)—as opposed to merely being physically associated (as a mixture) with the spinel forming materials through the use of various catalyst binder materials.

Applicant then discovered that when bastnaesite is in fact chemically reacted with various metal oxide ingredients such as those which are capable of forming a spinel (rather than being just mixed with them), there is a very dramatic increase in the $SO_x$ absorbent and/or catalyzing ability of the resulting bastnaesite/metal oxide materials. Having made this discovery, applicant then embarked upon a research program aimed at comparing the $SO_x$ absorbent/catalytic abilities of these bastnaesite/metal oxide materials with: (a) various metal oxides alone, (b) spinel alone, (c) bastnaesite alone, or (d) physical mixtures of bastnaesite and spinel (considered both as mixtures of the different particle species and as mixtures of bastnaesite particles and spinel particles which are bound together in composite particles through the use of binder materials). This experimental program also established that applicant's chemically reacted bastnaesite/metal oxide materials may be used to: (i) catalyze the oxidation of $SO_2$ to $SO_3$, (ii) absorb $SO_3$ formed by the $SO_x$ catalytic activity of the same materials, (iii) absorb $SO_x$ formed by other separate and distinct $SO_x$ catalyst species such as those provided with cerium and vanadium (e.g., those in the form of catalytically inert spinels which are impregnated with cerium or vanadium) and/or (iv) catalyze the reaction of the oxidation of $SO_2$ to $SO_3$ and cause it to be absorbed by other kinds of separate and distinct catalysts such as alumino-silicate hydrocarbon cracking catalysts (and especially so-called "bottoms" cracking catalysts).

The experimental evidence which established these findings will be given in subsequent portions of this patent disclosure. For now, however, suffice it to say that the herein described processes improve upon the circumstances and results associated with those processes described in the 979 patent. For example, the desired "absence" of complex metal oxides within those spinels described in the 979 patent also can be obtained in the processes of this patent disclosure—but without certain formidable drawbacks which are associated with the processes and/or materials described in the 979 patent. Of even more importance, however, is the fact that applicant has found that the herein described bastnaesite/crystalline metal oxide materials are very good $SO_x$ absorbents—even if they do in fact contain high concentrations of those complex metals which the processes described in the 979 patent sought to avoid. Indeed, applicant often found that even if such undesired free complex metal oxide compounds are produced in applicant's bastnaesite/crystalline metal oxide materials, and even if they exist in concentrations greater than those permitted in the 979 processes (i.e., in concentrations greater than 5% by weight), the herein described bastnaesite/crystalline metal oxide materials still have $SO_x$ absorbent activities which are much better than those exhibited by the spinels produced by the processes described in the 979 patent.

Having noted this, however, it now should be made clear that applicant also has found that if the small sized spinel-forming ingredients called for in the 979 patent (i.e., less than 5 nanometers) are chemically reacted with bastnaesite, the resulting materials are often even more effective $SO_x$ catalyst/absorbent materials than those made with larger particles. In any event, the herein described processes, and the products made from them, are not hampered by the low particle densities, restrictive pH limitations and/or those catalyst regeneration problems associated with the presence of undesirable complex compounds (e.g., free magnesium oxide, stoichiometric spinel) which detract from the $SO_x$ absorbent performance of several prior art metal oxide based $SO_x$ absorbent/catalyst materials, including those spinels described in the 979 patent.

The processes described in the present patent disclosure have some very important economic advantages as well. For example, these processes completely remove what is perhaps the most negative economic aspect of the processes taught in the 979 patent—namely, the strict requirement that their spinel-forming ingredients (e.g., magnesia and alumina) have particle sizes of less than 5 nanometers. In other words, applicant has found that the 979 requirement that the ingredient particles be sized at less than 5 nanometers, can be completely obviated when comparable spinel-forming ingredients are chemically reacted with a bastnaesite ingredient—rather than merely being physically mixed with them. Indeed, applicant has found that when bastnaesite is in fact chemically reacted with spinel-forming ingredients (e.g., magnesia, alumina, etc.), all of the ingredients (including the bastnaesite) can have much larger particle sizes. For example, alumina, magnesia and bastnaesite particles sized up to about 1,000 nanometers can be readily employed without suffering adverse effects on the $SO_x$ absorbent/catalytic abilities of the herein described bastnaesite/spinel materials. This is an extremely important point because spinel-forming ingredients having particle sizes of less than 5 nanometers are much more expensive compared to chemically identical ingredients having larger particle sizes. For example, alumina particles sized in the 20 to 1,000 nanometer range, and especially those sized in the 60–100 nanometer range, are far less expensive than the 2 to 5 nanometer varieties called for in the 979 patent. It bears repeating, however, that negation of the particle size limitations of the 979 patent is not to say that such smaller sized ingredients (i.e., those sized at less than 5 nanometers) cannot be used in the present process—but merely to say that their use is not mandatory. In other words, the smaller sized particles are less preferred for largely economic reasons.

Finally, it also should be noted that the herein described processes—like those described in the 979 patent—are applicable to synthesis of materials which can be used for purposes other than removal of $SO_x$ from FCC units. For example, the bastnaesite/metal oxide materials produced by the processes of the present patent disclosure may be employed in: (1) the production of spinel/crystalline metal oxide materials used for catalysis of other reactions (e.g., petroleum processing reactions such as: (i) naphtha reforming, (ii) steam, methane reforming, (iii) hydrotreating and hydroprocessing, (iv) dehydrogenation catalysts, (v) methane coupling, (vi) oxidative dehydrogenation and (vii) oxidation of propylene, (2) bastnaesite/crystalline metal oxide particles which are especially adopted for use in admixture with other totally different kinds of catalyst particles (e.g., hydrocarbon cracking catalysts such as those alumino silicates and amorphous aluminas used in making so-called bottoms cracking catalysts) in order to absorb any $SO_x$ which is incidentally produced by a catalyst whose principal duty is to catalytically crack hydrocarbons and (3) bastnaesite/crystalline metal oxide materials having properties completely different from catalytic properties (e.g., superconductivity properties).

SUMMARY OF THE INVENTION

In their most fundamental terms, the processes of this patent disclosure serve to chemically react bastnaesite with at least one metal oxide material in order to form certain novel bastnaesite/metal oxide materials wherein the bastnaesite and/or at least a component of bastnaesite and at least one metal oxide material are chemically reacted. Applicant has opined that the exact nature of this chemical reaction is one wherein a $La_2O_3$ component of the bastnaesite becomes a part of the crystalline structure of a spinel-like component of the resulting bastnaesite/metal oxide product. Such materials are particularly useful as $SO_x$ absorbent/catalyst materials. Bearing in mind the previous discussions regarding the loose nature of the nomenclature associated with the term "bastnaesite", applicant can further identify their end product materials through use of the generalized formula: $(Ce,La)OF/R_2^{2+}O\ R_2^{3+}O_3$. Of all the materials which potentially fall within this definition, those which are based upon bastnaesite/magnesia/alumina (i.e., $(Ce,La)\ OF/MgO/Al_2O_3$), are of primary importance. This patent disclosure also is particularly concerned with using the herein described materials as $SO_x$ absorbent/catalyst materials: (1) in their own right, (2) in chemically and/or physically-bound conjunction with known $SO_x$ catalysts such as vanadium and cerium and (3) in conjunction with other totally different kinds of catalyst particles such as those aluminosilicate catalysts commonly used to "crack" crude petroleum.

The most general processes for making the herein described materials will comprise: (1) dispersing a $R_2^{3+}[B]$ compound such as alumina ($Al_2O_3$) in a liquid media (such as water) which also contains between about 1.0 and about 10.0 milliequivalents of a mono-protonic acid (e.g., nitric acid, formic acid, acetic acid, etc.) per gram of the $R_2^{3+}$ component of the $R_2^{3+}[B]$ compound (e.g., per gram of aluminum in $Al_2O_3$) in order to create a $R_2^{3+}[B]$ sol material (e.g., an alumina sol); (2) mixing a $R^{2+}[A]$ compound such as magnesia (MgO) with the $R_2^{3+}[B]$ sol material and thereby creating a $R^{2+}[A]/R_2^{3+}[B]$ gel composition (e.g., a magnesia/alumina gel composition); (3) adding a bastnaesite material (e.g., a (Ce,La)OF material) to the $R^{2+}[A]/R_2^{3+}[B]$ gel composition and thereby creating a bastnaesite/$R^{2+}[A]/R_2^{3+}[B]$ total reaction composition; (4) spray drying the bastnaesite/$R_2^{2+}[A]/R_2^{3+}[B]$ total reaction composition in order to produce a solid solution material and (5) calcining the solid solution material resulting from the spray drying in order to produce a solid solution of bastnaesite, $R^{2+}$ oxide (e.g., MgO) and $R_2^{3+}$ oxide (e.g., $Al_2O_3$) i.e., producing a bastnaesite/$R^{2+}O/R^{3+}+O_3$ material (e.g., a bastnaesite/magnesia/alumina material ) having the generalized formula: $(Ce,La)OF/R^{2+}O/R_2^{3+}+O_3$ or $(Ce,La)OFF/nR^{2+}O/mR_2^{3+}+O_3$) and drive off, as gases, undesired elements such as those contained in the [A], [B] etc. components of the $R^{2+}[A]$, $R_2^{3+}[B]$ ingredients (and/or in the mono-protonic acid and/or in the liquid media) of the total reaction composition and thereby producing bastnaesite/metal oxide materials (e.g, bastnaesite/MgO/$Al_2O_3$ materials) wherein at least a component of bastnaesite and at least one of the metal oxide materials employed (e.g., MgO) are chemically reacted with each other.

Next, it should be noted that there are some particularly preferred embodiments of the above-described process. One of these involves the additional step of separately reacting a portion of the $R^{2+}[A]$ ingredient (e.g., MgO) , with the bastnaesite and then adding the resulting bastnaesite/$R^{2+}[A]$ material (bastnaesite/magnesia) to a $R^{2+}[A]/R_2^{3+}[B]$ gel composition (e.g., to a magnesia/alumina gel composition). Expressed in patent claim language this preferred process will comprise: (1) dispersing a $R_2^{3+}[B]$ compound such as alumina ($Al_2O_3$) in a liquid media such as water which also contains between about 1.0 and about 10.0 milliequivalents of a mono-protonic acid per gram of $R_2^{3+}$ component in the $R_2^{3+}[B]$ compound (e.g., per gram of aluminum in alumina) in order to create a $R_2^{3+}$ [B] sol material (e.g., an alumina sol material ); (2) adding a first portion of a $R^{2+}[A]$ compound to the bastnaesite material and allowing a resulting bastnaesite/$R^{2+}[A]$ material to age (e.g., from about 20 to about 180 minutes, and preferably for at least 60 minutes); (3) adding a second portion of a $R^{2+}[A]$ compound (e.g., magnesia) to the $R^{3+}[B]$ sol material and thereby creating a $R^{2+}[A]/R_2^{3+}$ gel composition; (4) adding the resulting bastnaesite/$R^{2+}[A]$ material to the $R^{2+}[A]/R_2^{3+}[B]$ gel composition to create a bastnaesite/$R^{2+}[A]/R_2^{3+}[B]$ total reaction composition; (5) spray drying the bastnaesite/$R_2^{2+}[A]/R_2^{3+}[B]$ total reaction composition in order to form particles and (6) calcining the particles resulting from the spray drying in order to produce crystals of a solid solution of bastnaesite, $R^{2+}$ oxide ($R^{2+}O$) and $R_2^{3+}$ oxide ($R_2^{3+}+O_3$) i.e., R 3+0 producing bastnaesite/metal oxide materials having the generalized formula: $(Ce,La)OF/R^{2+}O/R_2^{3+}+O_3$ (or $(Ce,La)OF/n\ R^{2+}O/mR_2^{+}+O_3$) (e.g., (Ce,La)OF/MgO/$Al_2O_3$) and drive off, as gases, any undesired elements such as those contained in the [A], [B] etc. components of the original $R^{2+}[A]$, $R_2^{3+}[B]$ compounds (and/or in the liquid media and/or in the mono-protonic acid) of the total reaction composition and thereby producing bastnaesite/metal oxide materials wherein at least a component of the bastnaesite and one or more metal oxide material is (are) chemically reacted with one another. Here again, the more preferred materials will be those wherein a component of the bastnaesite such as $La_2O_3$ is chemically reacted with a $R^{2+}O$ component (e.g., MgO) of the resulting bastnaesite/metal oxide material. It also should be noted at this point that applicant is of the opinion that the chemical reaction taking place between the bastnaesite and a metal oxide is one wherein a $L_2O_3$ component of the bastnaesite is transferred to the crystalline lattice structure of a spinel-like MgO $Al_2O_3$ component of the overall bastnaesite/metal oxide material.

The most preferred embodiments of the herein described processes will employ alumina as the $R_2^{3+}[B]$ ingredient and magnesia as the $R^{2+}[A]$ ingredient. The $R^{2+}$ alumina is best employed according to a procedure wherein: (1) it is dispersed in a water solution containing from about 5.0 milliequivalents of a mono-protonic acid per gram of aluminum in the alumina, (2) a magnesia-containing compound, and especially one wherein the magnesia is in true solution, is mixed with the alumina dispersion to form a gel, (3) bastnaesite is added to the gel, (4) the gel is spray dried and (5) the product of the spray drying is calcined. An even more preferred variation of this particular embodiment will be to: (1) disperse the alumina in a water solution containing 5.0 milliequivalents of acetic acid per gram of aluminum in the alumina, (2) add about one-third of the magnesia compound which is being employed in the overall process to a bastnaesite and age the resulting material for at least one hour, (3) add the balance of the magnesia which is being employed in the overall process to the alumina in order to form a magnesia/alumina gel; (4) add the bastnaesite and magnesia mixture to the magnesia/alumina gel, (5) spray dry the gel and (6) calcine the product of the spray drying.

Identity of Ingredients

Applicant's processes may employ a wide variety of starting materials. A list of such materials would include, but by no means be limited to, ingredients wherein: (i) a $R^{2+}$ component is selected from the group consisting of magnesium, zinc, calcium, iron and manganese, (ii) a $R_2^+$ component is selected from the group consisting of aluminum, cerium, iron, boron, manganese, lanthanum, chromium and the like (i.e., metals having like valances), (iii) the bastnaesite material is selected from the group consisting of naturally occurring bastnaesite, treated bastnaesite (e.g., calcined and/or acid leached bastnaesite) or synthetic bastnaesite-like materials (i.e., those having comparable metal oxide components in comparable relative proportions to bastnaesite minerals), (iv) the mono-protonic acid is selected from the group consisting of formic acid, acetic acid, or nitric acid and (v) the liquid medium is selected from the group consisting of water, an alcohol, an ether, a ketone (specially acetone) and mixtures thereof.

The more preferred species of [A] anions associated with the $R^{2+}$ cation can be selected from the group consisting of oxide, acetate, hydroxyacetate (which, incidentally, are particularly effective anion species for the practice of this invention), nitrate, hydroxynitrate, ethylate, ethoxide and mixtures thereof. The more preferred anionic [B] species associated with the $R_2^{3+}$ cation can be selected from the group consisting of acetate, hydroxyacetate (which here again are particularly preferred), nitrate, oxide, hydroxide, hydroxynitrate, and mixtures thereof. Thus some of the most preferred starting materials might include cation-anion combinations wherein the resulting $R^{2+}[A]$ compound is selected from the group consisting of $R^{3+}$ hydroxyacetate, $R^{2+}$ acetate, $R^{2+}$ nitrate, $R^{2+}$ oxide, $R^{2+}$ hydroxynitrate, $R^{2+}$ acetate, $R^{2+}$ ethylate and the $R_2^{3+}[B]$ compound is selected from the group consisting of $R_2^{3+}$ hydroxyacetate $R_2^{3+}$ acetate, $R_2^{3+}$ nitrate, $R_2^{3+}$ hydroxynitrate, $R_2^{3+}$ acetate, $R_2^{3+}$ hydroxide, $R_2^{3+}$ oxide and the like. However, when all is said and done, the most preferred $R^{2+}[A]$ compound is a magnesium [A] compound (e.g., magnesia) and the most preferred $R^{2+}[B]$ compound is an aluminum [B] compound (e.g., alumina.

It also should be noted in passing that in carrying out either the more general embodiments of the herein described processes (wherein the $R^{2+}[A]$ ingredient is not separately reacted with the bastnaesite) or in carrying out some of the more preferred embodiments (e.g., wherein a portion of the $R^{2+}[A]$ ingredient (e.g., magnesia) is separately reacted with the bastnaesite and then added to a $R^{2+}[A]/R_2^{3+}[B]$ gel), a di-protonic acid or tri-protonic acid may be used for certain hereinafter described pH adjustment purposes. Nonetheless, at least a portion of the acid employed to disperse the $R_2^{3+}[B]$ ingredient such as alumina—and preferably all of the acid used for this purpose—must be further characterized by the fact that it is a mono-protonic acid. Moreover, the mono-protonic acid must be used in amounts such that it provides an acid equivalency of from about 1.0 to about 10.0 milliequivalents of mono-protonic acid per gram of $R_2^{3+}$ in the $R_2^{3+}[B]$ ingredient (e.g., per gram of aluminum in alumina). Either organic, mono-protonic acids or mineral, mono-protonic acids, or mixtures thereof, may be employed for applicant's $R_2^{3+}[B]$ dispersion purposes. Those mono-protonic acids which do not tend to leave residues upon decomposing under the calcining conditions employed in the herein described processes are particularly preferred. It is for this reason that the two most preferred species of organic, mono-protonic acid are acetic acid and formic acid. For like reasons, the most preferred mineral, mono-protonic acid is nitric acid.

Milliequivalents of Acid Ingredients

Upon discovering that the herein described processes are sensitive to the number of milliequivalents of mono-protonic acid per gram of $R_2^{3+}$ in the $R_2^{+}[B]$ compound (e.g., per gram of aluminum in alumina)—as opposed to the pH per se of the dispersion—applicant ran an experimental program aimed at defining the range of this acid equivalency parameter. This program established that use of from about 1.0 to about 10.0 milliequivalents of mono-protonic acid per gram of $R_2^{3+}$ in the $R_2^{3+}[B]$ compound (e.g., alumina) give the best overall results for a wide variety of starting materials. Use of at least 4.0 milliequivalents and, even more preferably, use of about 5.0 milliequivalents gave particularly good results for a wide variety of $R^{2+}[A]$, $R_2^{3+}[B]$, bastnaesite ingredients—and especially for bastnaesite/magnesia/alumina total reaction compositions.

As a final comment on the subject of the nature of the acid(s) which can be used in the herein described processes, it should be understood that the terms "pH" and "milliequivalents" ("meq") must be distinguished from one another for the purposes of this patent disclosure. In order to make this distinction, it may be useful to think of the term "pH" as meaning the concentration of hydrogen ions (H+) per unit volume of acid. Next, it should be noted that, in many chemical reactions which are sensitive to pH conditions, it usually does not matter what source of H+ ions is used to create a given "pH"—that is to say that it does not matter whether the "pH-producing" H+ ions come from a mono, di-, or tri-protonic acid source. This, however, is decidedly not the case with the processes of this patent disclosure. For applicant's purposes, the concept of "milli-equivalents" of acid from a mono-protonic acid source is all important—and within a very wide pH range it does not particularly matter what pH is created by the use of the 1.0 to 10.0 milliequivalents of that mono-protonic acid which are used to carry out applicant's $R_2^{3+}[B]$ (e.g., alumina) dispersion step. It also should be noted that those aluminas which applicant prefers for the practice of this invention also are characterized by the fact that they have dispersibilities in excess of 95% (and most preferably, greater than 98.5%) when from 1.0 to 10.0 milliequivalents of a mono-protonic acid is used to disperse them.

For example, under the teachings of this patent disclosure, if applicant added say a dispersible alumina to a solution having a pH of 3.0, there would be no clear understanding as to what would happen if the "valence" of that acid were not also known (i.e., if it were not known whether the acid which created the 3.0 pH was a mono-protonic, di-protonic or tri-protonic acid). If the acid used to create the 3.0 pH were sulfuric acid, a typical di-protonic acid, the alumina would simply form a slurry and not a sol. That is to say it eventually would settle out and fail to create a material suited to the practice of this invention. On the other hand, use of an appropriate amount of a mono-protonic acid such as nitric acid, would produce a usable alumina sol which in time would gel—and, hence, would be well suited for the practice of this invention. In other words, it should be understood that under the teachings of this patent disclosure, one could alter the pH of a total reaction mixture, or the pH of the $R_2^{3+}[B]$ sol, by adding sulfuric acid, but still not produce a suitable total reaction mixture if an insufficient amount (e.g., as was the case in Example 7 of this patent disclosure) or an excess amount, of a mono-protonic acid were originally used to create the $R_2^{3+}[B]$ sol. It also should be noted in passing that there are several commercially available $R_2^{3+}O_3$ materials (e.g , alumina powders) that are already provided with acid(s). Consequently, in the case of those aluminas, which are already provided with mono-protonic acids, all one may have to do in order to make a dispersion suitable for applicant's purpose is to add the overall alumina/acid material to a liquid media such as water and stir. In other words, if the acid already accompanying the alumina happens to be a mono-protonic acid, and if this acid happens to provide sufficient acid "equivalents" to carry out applicant's processes, these aluminas need only be mixed with a suitable liquid media such as water. If not, suitable amounts of a mono-protonic acids will have to be added to the alumina dispersion.

However, once the $R_2[B]$ compound (e.g., alumina) is properly dispersed through use of a mono-protonic acid, composition, then various di- and/or tri-protonic acids (sulfuric acid as well as mono-basic acids) may be used to adjust the pH of the R$_2$[B] dispersion and/or the total reaction composition. For example, once a given total reaction composition has been formed according to the teachings of this patent disclosure, the pH of that total reaction composition may vary all the way from about 2.0 to about 10.0; and this pH range may be achieved through use of a very wide variety of mono, di or tri-basic acid(s). Indeed, even alkaline reagents can be used to make pH adjustments toward the alkaline end of this pH range.

It also should be noted that in establishing these pH values, applicant generally found that if the pH of a total reaction composition falls below about 2.0, dispersed R$_2$[B] particles, and especially dispersed alumina particles, tend to become dissolved into ionic forms. This is extremely detrimental to applicant's process and should be avoided. It also should be noted in passing that alumina sol systems tend to become very viscous at pH values between about 6.0 and 8.0—but again tend to become less viscous at pH levels between about 8.5 and about 11.0. Next, it should be noted that the upper limit (11.0 pH value) is more in the nature of a practical limit rather than a technical one. This follows from the fact that the most preferred alkaline reagent for the practice of this invention (if indeed one is used) is commercially available forms of ammonium hydroxide which usually have pH values ranging between about 11.0 and about 11.5. It also should be emphasized that certain metal containing alkaline reagents such as sodium, lithium or potassium hydroxide should not be employed to adjust the pH of any of applicant's reaction systems since their metal components tend to "poison" the resulting catalyst materials.

Next, it should be noted that since the H+ ions needed to disperse applicant's R$_2$$^3$$^+$[B] ingredient (e.g., alumina) can be supplied by mono-protonic acids of differing acid species, and since each such acid species will have a different molecular weight, some further "internal adjustments" within applicant's 1.0 to 10.0 milliequivalent parameter will usually be in order based upon certain other attributes of the mono-protonic acid. For example, the molecular weights of the most preferred acids used by applicant in dispersing his R$_2$$^3$$^+$[B] ingredients are:

| NAME | FORMULA | MOLECULAR WEIGHT |
|---|---|---|
| Formic | HCOOH | 46 |
| Acetic | CH$_3$COOH | 60 |
| Nitric | HNO$_3$ | 63 |
| Hydrochloric | HCl | 36.5 |

Therefore, in order to supply the same number of H+ ions from each of these different acid species, one would have to take into account the molecular weight of each acid. By way of a more specific example, it would require 60 grams of acetic acid to supply the same number of H+ ions as are supplied by 46 grams of formic acid. Applicant also notes in passing that, in common chemical parlance, the molecular weight of such an acid is often regarded as one equivalent of acid; and if it is a mono-protonic acid, this amount is assumed to contain one equivalent of H+ ions. Thus, quantitatively speaking, a milliequivalent of such an acid, at least for the purposes of this patent disclosure, could be thought of as the weight of mono-protonic acid × 1000-/molecular weight of that acid. Thus, if one always uses the same acid, one might simply specify the grams of that acid per gram of aluminum in the R$_2$$^3$$^+$O$_3$ compound (e.g., alumina) as an "equivalent amount" and a thousand times that as a "milliequivalent" amount of that acid.

Another acid related concept which should be noted in regard to applicant's concern for the concept of "acid equivalency"—as opposed to pH—is the "strength" of an acid. Again, applicant is primarily interested in the number of H+ ions which are used to disperse the R$_2$$^3$$^+$[B] ingredient and not with the pH of that dispersion per se. In this regard, another conceptual difficulty lies in the fact that acids differ in the degree to which they disassociate in solution. For purposes of illustration, one might consider two acids: acetic acid and nitric acid. The equilibrium set up between these two acids and their ions are as follows:

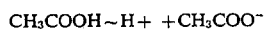

$$CH_3COOH \sim H+ \; +CH_3COO^-$$

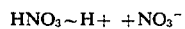

$$HNO_3 \sim H+ \; +NO_3^-$$

Next, it should be noted that one could have exactly the same number of milliequivalents of each acid, but since acetic acid is a so-called "weak" acid; a large proportion of its CH$_3$COOH component co-exists with the H+ ion and the CH$_3$COO (acetate ion). On the other hand, practically none of the HNO$_3$ of nitric acid co-exists with the H+ ion and the NO$_3$$^-$ (nitrate ion); hence, it is regarded as a "strong" acid. Thus for the same number of milliequivalents of acid the nitric acid will supply more H+ ions to the alumina than will be supplied by acetic acid. Unfortunately there is no easy way of accurately quantifying this "strength" effect. Hence, for the purposes of this patent disclosure, applicant must rely upon the 1.0 to 10.0 milliequivalent parameter to make adjustments for the strength of the mono-protonic acid employed. In general, however, applicant has found that for the purposes of their processes, nitric acid and hydrochloric acid are usually about two or three times more effective than acetic acid in their ability to disperse a R$_2$$^3$$^+$[B] compound such as alumina. That is to say that, in performing this dispersion function, about 1 meq of nitric acid or hydrochloric acid gives about the same effect as about 2.0 to 3.0 meq of acetic acid. By way of yet another example, applicant has found that formic acid's ability to disperse alumina is somewhere between that provided by a "weak acid" (acetic acid) and a "strong acid" (nitric acid).

In dealing with certain dispersible R$_2$$^3$$^+$O$_3$ compounds, and especially dispersible aluminas, it is important to appreciate that the number of H+ ions (and to some extent their concentration) not only influences the viscosity of the resulting sols, it also will, to varying degrees, influence the size of the clusters and the rate at which the sols gel. As a final note with respect to the use of mono-protonic acid ingredients, applicant would point out that once the identity of the R$^2$$^+$[A] and R$_2$$^3$$^+$[B] ingredients is established (e.g., magnesia and alumina), the interaction of the particular materials with bastnaesite can be even further encouraged by use of certain specific mono-protonic acids. For example, applicant has established that acetic acid is particularly effective in creating magnesia/alumina total reaction compositions.

Theoretical Suppositions

Applicant has opined that the reason why use of a mono-protonic acid produces effective SO$_x$ absorbent-/catalyst materials while use of di- or tri-protonic acids does not, is that a mono-protonic acid creates a chemical environment wherein a $La_2O_3$ component of bastnaesite is more readily transferred from the lattice of the bastnaesite to the lattice of at least one metal oxide material which makes up the final product material. One highly plausible explanation for the dramatic improvements in the ability of the herein described materials to absorb and/or catalyze $SO_x$ seems to be that once a lanthanum component (e.g., as $La_2O_3$) is removed from a bastnaesite lattice (and subsequently forms a $R_2O \cdot La_2O_3$ compound such as $MgO \cdot La_2O_3$) the remaining bastnaesite material will have "voids" or "holes" in its crystalline structure. Applicant believes that the presence of such voids enable reactants such as $SO_x$ to come into contact (at the molecular level) with certain remaining components (e.g., ceria components of the bastnaesite) of a resulting bastnaesite/metal oxide material and/or of a resulting bastnaesite/metal oxide material and thereby those provide $SO_x$ catalysis, $SO_x$ absorbance and $SO_x$ regeneration conditions which make these materials so useable as $SO_x$ additives. To some extent, this reasoning is buttressed by several general observations. For example, applicant has noted that, in general, if a $R^{2+}O$ compound (e.g., magnesia) is already intimately associated with a $R_2^{3+}$ compound (e.g. alumina) when the $R_2^{3+}$ sol is being created transfer of $La_2O_3$ from the bastnaesite to the metal oxide will be much less pronounced. Concomitantly, applicant also found that a more effective, and hence more preferred, way of effecting such a transfer of $La_2O_3$ from a bastnaesite lattice to a metal oxide lattice is by adjusting the acid equivalency conditions during preparation of their $R_2^{3+}O_3$ sol before the sol is mixed with the bastnaesite. Applicant's processes can usually be made even more effective when certain special steps are taken to cause the $La_2O_3$ to be taken from the bastnaesite and transferred to the $R^{2+}[A]$ ingredient (e.g., to a magnesia component of the resulting material). For example, this $La_2O_3$ transfer appears to be especially pronounced when a portion of the $R^{2+}[A]$ (e.g., magnesia) ingredient (e.g., from about 20 to about 40 weight percent, and most preferably about 33 weight percent of the $R^{2+}[A]$ ingredient), is reacted with the bastnaesite before that bastnaesite is associated with the $R^{3+}[B]$ (e.g., alumina) ingredient.

Relative Proportions of Ingredients

Applicant's primary "reactive ingredients" (i.e., $R^{2+}[A]$, $R^{3+8}B]$ and bastnaesite) will, most preferably, constitute from about 10 to about 50 weight percent of any given total reaction composition (i.e., the composition which is made up of the primary reaction ingredients plus the liquid media and the acid(s) ingredients). It also should be noted that the relative proportions of the primary reactive ingredients, relative to each other in the total reaction composition, will not equal the relative proportions of the reactive ingredients in the end product materials i.e., in the bastnaesite/$R^{2+}O$/$R_2^{3+}O_3$ particles. This follows from the fact that the liquid media and virtually all the acid ingredient(s) are completely driven off during the spray drying and calcining steps of the herein described processes. In any case, the relative proportions of the ingredients in a given total reaction mixture should be such that the bastnaesite will, most preferably, comprise from about 5% to about 50% of the final ingredients when the end products of this entire process are in their "dry" (i.e., calcined) final product, state (e.g., in the form of MS-FCC particles).

The $R^{2+}O$ $R_2^{3+}O_3$ (e.g., the MgO $Al_2O_3$ component) of the overall bastnaesite/$R^{2+}O$ $R_2^{3+}O_3$ final product will if no other ingredients are used, constitute the entire remaining 50–95 weight percent of applicant's final product materials. Any optional $SO_x$ catalyst materials (such as ceria) which become a part of the final product material should be used in proportions such that they constitute less than about 10.0 weight percent of said final product material.

Any optional ingredients used to enhance the manufacturing process (e.g., viscosity agents, gas evolution agents, etc.), if any are used, may constitute from about 5 to about 25 weight percent of a given total reaction mixture. More preferably, such optional production ingredients, if used, will constitute about 10% of a total reaction mixture. For the most part, those optional ingredients used to enhance the manufacturing process will be almost completely driven off by applicant's spray drying and calcination steps. And, as yet another note on the subject of relative proportions, applicant would point out that, in general, the mono-protonic acid ingredient(s) of the herein described processes will comprise only from about 1.0 percent to about 10.0 weight percent of a given total reaction mixture in order to achieve the 1.0 to 10.0 milliequivalents requirement for practice of this invention. These mono-protonic acids will likewise be substantially driven off by applicant's calcination step. This 1.0 to 10.0 weight percent range for the mono-protonic acid does not, however, take into account any acid used to create certain soluble magnesia compounds such as magnesium acetate which may be employed to create a Mg[B] material wherein the magnesium is in true solution. Here again, however, any magnesium acetate producing acid(s) would be completely driven off during applicant's calcining step.

The liquid media will constitute most of the remaining 50 to 90 weight percent of the most preferred total reaction compositions. That is to say that the liquid media will most preferably constitute 50 to 90 percent of the total weight of: (1) the primary reactive ingredients (and optional ingredients, if any are used), (2) the mono-protonic acid and (3) the liquid media. Thus, for example, a total reaction mixture containing 40 percent by weight of reactive ingredients $R^{2+}[A]$, $R_2^{3+}[B]$ and bastnaesite and 10 percent by weight of acid and volatile optional ingredients would, according to applicant's preferred proportions, contain 50% by weight of a liquid medium (or media) such as water, alcohol, etc. (if one neglects the weight of the relatively minor amounts of the mono-protonic acid ingredient in the total reaction composition). Again, making adjustments for the fact that most of the acid, most of the volatile optional ingredients (e.g., gas evolution agent(s), viscosity agent(s), etc.) and virtually all of the liquid media are volatilized by the spray drying and calcination steps, and making further adjustments for the fact that the [A] and [B] components of the original $R^{2+}[A]$ and $R_2^{3+}[B]$ ingredients are replaced by oxygen during the calcination process, an original total reaction mixture comprised of say 10 weight percent of volatile, optional ingredient(s), 10 weight percent bastnaesite, 40 weight percent metal oxide ingredients and 50 percent water (and minor amounts of acid) would calcine to a final "dry weight" product which is comprised of about 20 percent bastnaesite and about 80 percent metal oxide material.

By way of yet another example, if the primary reactive ingredients in the example given above were 40% by weight of the total reaction mixture and 50% of said reactive ingredients were bastnaesite, then the resulting total reaction mixture would be comprised of bastnaesite (20%), $R^{2+}[A]$ and $R_2^{3+}[B]$ (20%), optional and volatizable ingredients (10%) and liquid media (50%). This total reaction mixture would calcine to final product which contains about 50% bastnaesite, 25% $R^{2+}[A]$ and 25% $R_2^{3+}[B]$ owing to the fact that essentially all of the other ingredients are ultimately driven off by the spray drying and calcination procedures.

With respect to the subject of the relative proportions of the ingredients, it also should be noted that applicant prefers to express their $R^{2+}/R_2^{3+}$ concentrations (e.g., magnesia/alumina) as the atomic ratio of $R^{2+}$ to $R_2^{3+}$. Thus, in the case of a magnesia/alumina system, Mg/Al atomic ratio of 1.0 would be a 50% magnesia-rich material. In any event, applicant's experimental program established that the most preferred range of this $R^{2+}/R_2^{3+}$ ratio is from about 0.5 (the stoichiometric ratio) to about 1.5 with ratios of about 1.0 being highly preferred. Applicant would also note in passing that according to some teachings of the prior art—this ratio should not to be exceeded. However, applicant has found that with the use of chemically reacted bastnaesite, this higher value can be employed. Indeed, applicant often found that the most preferred ratio is above 1.0.

Again, the preferred proportion range for the bastnaesite component of these materials is from about 5 to about 50 percent of the resulting bastnaesite/metal oxide material. The most preferred amount of bastnaesite in the end product material will usually be about 33 percent. When premixing the bastnaesite and $R_2O$ ingredient (e.g., magnesia) and especially where the magnesium compound is in the form of either its acetate or nitrate, applicant also prefers to establish a desired ratio of the final product and then obtain that ratio in the end product by premixing from about 5 to about 50% of the total magnesium employed with the bastnaesite. Thereafter, the resulting magnesium/bastnaesite composition is added to a composition comprised of an aluminum compound (e.g., alumina) and the remaining magnesium compound.

Spray Drying Operations

Applicant's spray drying operations can be carried out by techniques well known to the catalyst production arts (e.g., those disclosed in the 979 patent could very well be employed) to produce particles which are intended for use in FCC processes. For example such spray drying could be used to produce particles having a range of sizes such that essentially all such particles will be retained by a Standard U.S. 200 mesh screen and essentially all such particles will be passed by a Standard U.S. 60 mesh screen. Other physical forms of the end products (e.g., relatively large particles or pellets) are generally less preferred—but may have utility in certain select cases e.g., where the bastnaesite/crystalline metal oxide end product material is not used in a fluidized catalytic process.

Optional Drying Procedures

It should also be noted that in addition to a spray drying step, applicant's overall process may be enhanced by use of a separate and distinct drying step which is carried out after the drying which naturally results from the spray drying step. For example, those additional drying procedures taught in the 979 patent may be employed. Such additional drying may serve to better "freeze" the ingredients in the homogeneous state in which they originally existed in the total reaction composition. This additional drying will further serve to remove any remaining traces of the liquid medium which may be still present in the interstices of the particles and/or associated with the particulate product of the spray drying step (e.g., associated as water of hydration). Drying times for this distinct drying step will normally take from about 0.2 hours to about 24 hours at temperatures which preferably range from about 200° F. to about 500° F. (at atmospheric pressure), but in all cases, at temperatures greater than the boiling point of the liquid medium employed (e.g., greater than 212° F. in the case of water).

Calcining Procedures

After such drying or desiccation—if such a step is employed—it remains only to take the solid matrix of the anhydrous particles produced by the spray drying and convert the $R^{2+}$ and $R^{3+}$, etc. components of the $R^{2+}[A]$ and $R_2^{3+}[B]$ ingredients to their oxide forms, e.g., $R^{2+}O$, $R_2^{3+}O_3$, etc. by a calcination step. In effect, the calcination step serves to drive off the [A] and [B] components and replace them with oxygen and thereby produce a final product having only the oxide forms of the $R^{2+}$ and $R^{3+}$, etc. ingredients. The calcination step also serves to drive off, as gaseous oxides, all but the "desirable" components of the resulting bastnaesite/crystalline metal oxide materials. For example, this calcination step will drive off the liquid media, acid, viscosity agent and gas evolution agent components of a total reaction mixture. Such calcination is readily accomplished by heating the products of the spray drying step—or of the optional desiccation step—at temperatures ranging from about 1,000° F. to about 2,000° F. (preferably at atmospheric pressure) for from about 60 minutes to about 240 minutes, and most preferably at about 1,350° F. for about 180 minutes. The catalyst particles should not, however, ever be raised to their melting temperatures.

Other Optional Procedures

As was previously discussed, one or more viscosity agents and/or gas evolution agents may be added to the original, total reaction mixture. Such viscosity agents may be used to help "freeze" the ingredients of the homogeneous distribution present in the original total reaction composition while the total reaction composition is undergoing volatilization. In effect, such viscosity agents serve to inhibit the process reaction kinetics by raising a reaction mixture's viscosity and thereby decreasing the mobility of the reactive ingredient species while they are totally suspended in the liquid phase of the total reaction composition. In other words, such materials can provide those total reaction compositions which are undergoing volatilization with a better opportunity to form a solid matrix before certain undesired chemical reactions (e.g., formation of stoichiometric spinel) can take place. Starch and/or gum arabic are particularly preferred viscosity agents for this purpose. A wide variety of known gas evolution agents can likewise be added to the total reaction composition to encourage evolution of gases (e.g., those formed from the [A] and [B] ingredients) during calcination. Again, these viscosity agents and/or gas evolution agents will be driven off by applicant's calcination step.

Other preferred variations of the herein described processes may include: (1) use of nonorganic thickening agents such as alumina (i.e., alumina used in addition to that alumina which may otherwise employed in say a magnesia, alumina, bastnaesite total reaction composition), (2) adjustment of the solids content of a reaction composition before it is fed to a spray dryer and (3) aging of the $R_2{}^{3+}O_3$ sol (e.g., alumina sol) before the sol is reacted with the other ingredients.

Finally, various metallic atoms, such as those of vanadium, cerium, platinum etc. also can be associated with the bastnaesite/crystalline metal oxide materials produced by the processes described in this patent disclosure. For example, this association can be achieved by adding the components directly to the primary "reactive ingredients" ($R^{2+}[A]$, $R_2{}^+[B]$ and bastnaesite) or by impregnating the bastnaesite/spinel products of this patent disclosure after they are formed or by forming composite particles comprised of ceria-containing particles and bastnaesite/spinel particles which are "glued together" through use of various catalyst binder materials well known to the catalyst production arts. By way of a more specific example of such techniques, vanadium pentoxide $V_2O_5$, in oxalic acid, could be soaked into applicant's resulting bastnaesite/crystalline metal oxide materials. The resulting vanadium-impregnated bastnaesite/crystalline metal oxide material is then re-dried at about 250° F. from about 60 minutes to about 240 minutes and subsequently re-calcined for about 180 minutes at about 1350° F. This calcination causes the oxalate to break down to $CO_2$ and steam which are driven off as gases leaving the vanadium in the form of catalytically active $VO_2{}^+$ ions Bastnaesite/crystalline metal oxide materials made by such impregnation techniques most preferably will comprise from about 0.5 to about 4 percent vanadium by weight, with about 2 percent by weight being a particularly preferred proportion.

Optional Goals Re: Concentrations of Complex Metals

Even though it is by no means mandatory, one optional, and preferred, goal of the herein described processes is to produce bastnaesite/metal oxide materials having less than about 5% by weight of undesired complex compounds such as free magnesium oxide and/or stoichiometric spinel. This is especially true in those cases where the material is to be used as a $SO_x$ absorbent and/or catalyst. Preferably, applicant's bastnaesite/-metal oxide materials will have even lower complex compound concentrations. Thus, for the purposes of this patent disclosure, applicant's use of expressions like: "virtually no" undesirable complex compounds in the bastnaesite/crystalline metal oxide material or "substantially free of" such complex compounds, or expressions like bastnaesite/metal oxide materials having "no", "small amounts" "minimal amounts" etc of such complex compounds generally can be taken to mean those bastnaesite/crystalline metal oxide materials having less than about 5% by weight of such undesired complex metal oxide compounds.

However, having said this, it again should be strongly emphasized that, unlike the case of the spinel materials described in the 979 patent, the attainment of this 5% or less complex compound concentration is not essential to production of effective $SO_x$ absorbent/catalyst materials under the teachings of the present patent disclosure. Indeed, bastnaesite/metal oxide materials having more than 5% by weight (and up to about 10% by weight) of such complex metal oxides will still fall well within the teachings and/or spirit of this patent disclosure. That is to say that—in sharp contrast to the spinels described in the 979 patent—bastnaesite/crystalline metal oxide materials having more than 5% of such complex compounds are, nonetheless, very effective $SO_x$ absorbent-/catalyst materials. Indeed, applicant has generally found that such bastnaesite/metal oxide materials are usually more effective than analogous spinels having less than 5% complex compounds which are produced by the processes of the 979 patent. It is also true, however, that those bastnaesite/crystalline metal oxide materials of this patent disclosure which do, in fact, have less than about 5% by weight of complex compounds are often even better $SO_x$ absorbent catalyst materials than those bastnaesite/crystalline metal oxide materials having more than 5% of such complex metal oxide compounds. Indeed, a comparison of FIGS. 1 and 2 of this patent disclosure even suggests that the bastnaesite has in some way chemically reacted with "free MgO". That is to say that the free MgO peak of FIG. 1 has virtually disappeared from the XRD pattern of the material if it is chemically reacted with bastnaesite. This observation may be (or may not be) consistent with applicant's theory that the most plausible chemical reaction taking place is one wherein a $La_2O_3$ component of the bastnaesite is reacting with a magnesium oxide component of a spinel-like material. It also should be noted that the relative $SO_x$ additive performances of the two materials whose XRD patterns are depicted in FIGS. 1 and 2, as $SO_x$ additives, also seems to bear out applicant's previously stated "bias" against the presence of complex compounds such as free MgO in $SO_x$ catalysts in general.

It also should be emphasized that applicant's chemically reacted bastnaesite ingredient(s) may, or may not, become an integral part of the crystalline structure of the resulting bastnaesite/crystalline metal oxide material. That is to say that even though one or more of applicant's bastnaesite ingredient(s) (e.g., $La_2O_3$) is (are) chemically reacted with one or more of the resulting materials' metal oxide ingredients (e.g., MgO, $Al_2O_3$, etc.), it (they) need not necessarily become an integral part of the resulting material's regular crystalline structure.

At present, applicant's x-ray diffraction (XRD) data is inconclusive with respect to the question as to whether or not any part of the chemically reacted bastnaesite (e.g., a $La_2O_3$ component) becomes an integral part of a regular, repeating unit within a given metal oxide material's crystalline structure; or conversely, whether such a component (e.g., $La_2O_3$) is simply dispersed throughout the metal oxide material without becoming a part of its lattice structure—a la the way in which "free magnesium" oxide is loosely distributed through a spinel's crystalline lattice structure when measures (such as those taught in the 979 patent) are not taken to prevent this kind of loose distribution. In other words, it might be the case that the chemically reacted bastnaesite (or a component of the bastnaesite such as $La_2O_3$) may be dispersed in a crystalline metal oxide without actually becoming a regular repeating unit of the resulting material's overall crystalline structure.

On the other hand, it also might well be the case that the bastnaesite (or a particular bastnaesite component such as $La_2O_3$) forms a regular part of a resulting metal oxide's (e.g., magnesia's) crystalline structure within an overall bastnaesite/metal oxide material. Again, at present, applicant is of the guarded opinion that the chemical reaction which has taken place is essentially a chemical reaction between the bastnaesite and the $R^{2+}$ component (e.g., MgO) of the overall metal oxide component of the resulting bastnaesite/metal oxide material; but applicant has not completely ruled out the possibility of a reaction of the bastnaesite with the $R_2^{3+}O_3$ component (e.g., $Al_2O_3$) or a reaction of the bastnaesite, or a particular component thereof, with an entire $R^{2+}O/R_2^{3+}O_3$ (e.g., $MgO/Al_2O_3$) crystalline metal oxide component of the overall material. Be all this as it may, a great deal of experimental evidence (e.g., X-ray diffraction, thermogravimetric and fluid catalytic cracking pilot plant) clearly shows that a chemical reaction of some kind has in fact taken place between the bastnaesite and at least one metal oxide ingredient (e.g., magnesia or alumina) and/or with an overall crystalline metal oxide molecule (e.g., a magnesia/alumina crystalline material).

BRIEF DESCRIPTION OF THE DRAWINGS

FIG. 2 depicts a XRD pattern for a material made with the spinel whose XRD pattern is depicted in FIG. 1, when that spinel is chemically reacted with bastnaesite according to the procedures of this patent disclosure.

FIG. 5 depicts the comparative $SO_x$ absorption performance of a spinel which is impregnated with a ceria $SO_x$ catalysts, versus a bastnaesite/spinel made according to this patent disclosure.

DESCRIPTION OF PREFERRED EMBODIMENTS

Figure 1:
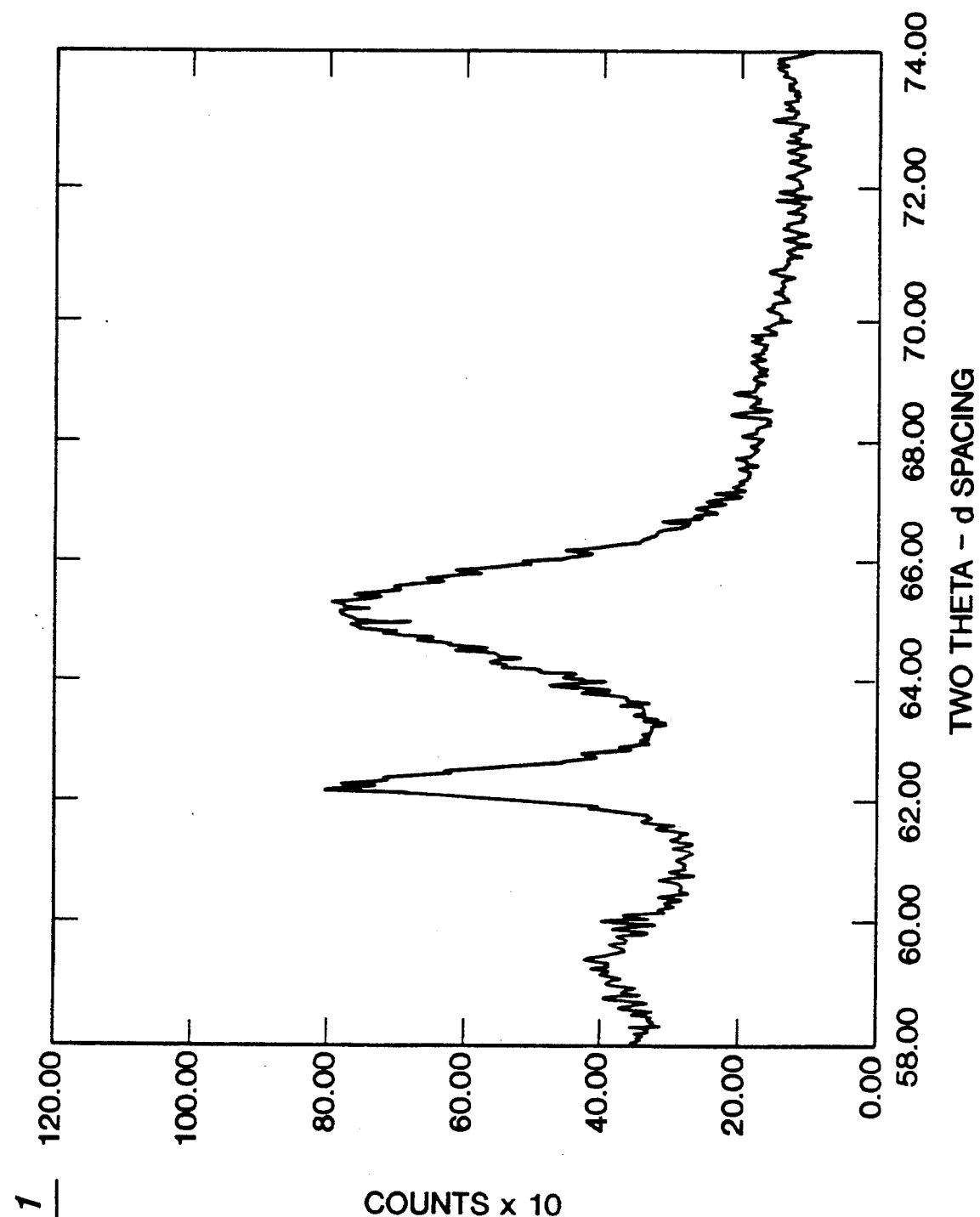
FIG. 1 depicts a XRD pattern for a spinel material wherein the Mg/Al atomic ratio equals one.

Chemically Reacted Experimental Program Re: The Nature and use of Bastnaesite/Crystalline Metal Oxide Materials Applicant's various experimental programs established: (1) that a chemical reaction has in fact taken place between the bastnaesite and one or more metal oxide ingredients (e.g., $R^{2+}O$ and/or $R_2^{3+}O_3$) used in these processes—or between the bastnaesite and an entire crystalline metal oxide component of the overall bastnaesite/metal oxide material (i.e., with a $R^{2+}OR_2^{3+}O_3$ component such as $MgO Al_2O_3$) (2) that the presence of complex compounds such as free magnesium oxide, stoichiometric spinel, etc. in the resulting bastnaesite/crystalline metal oxide materials is not in any way detrimental to the $SO_x$ absorbent/catalyst capabilities of these materials (e.g., relative to those of the spinels taught in the 979 patent) but, nonetheless, should be minimized for even greater effectiveness of the herein described materials as $SO_x$ absorbent/catalyst materials, (3) that matrices wherein bastnaesite and crystalline metal oxide materials are merely mixed together, or "glued" together through the use of a catalyst binder material (as opposed to being chemically reacted), are far less effective as $SO_x$ absorbent/catalyst materials compared to applicant's bastnaesite/crystalline metal oxide materials wherein the bastnaesite is in fact chemically reacted with at least one metal oxide component of the resulting material, (4) very significant comparative advantages of applicant's materials over a wide variety of prior art materials re: $SO_x$ absorbance and/or catalysis, (5) the ability of applicant's bastnaesite/crystalline metal oxide materials to act as separate and distinct catalysts in chemical reactions other than $SO_x$ absorption/catalysis reactions, (6) the ability of the herein described bastnaesite/metal oxides to catalyze the oxidation of $SO_2$ to $SO_3$ and cause it to be absorbed by other entirely different catalysts (e.g., by aluminosilicate hydrocarbon cracking catalysts), (7) the nature and range of the acid equivalency conditions which can be employed to achieve reactions between bastnaesite and the other ingredients e.g., $R^{2+}[A]$ and $R_2^{3+}[B]$, (8) the probable nature of the chemical reaction between the bastnaesite and a metal oxide—the probable transfer of $La_2O_3$ from the lattice of the bastnaesite to the lattice of a resulting metal oxide component of the overall resulting material—and most probably to the lattice of a $R_2O$ (e.g., MgO) component of an overall $R^{2+}O$ $R_2^{3+}O_3$ (e.g., $MgO Al_2O_3$) component of the resulting bastnaesite/crystalline metal oxide material and (9) the ability of the herein described bastnaesite/spinel materials to perform an $SO_x$ additive function when they are mixed with other catalysts—either in the form of particle mixtures or in the form of composite particles.

Representative TGA Tests

Measurement of the absorption rate of $SO_x$ on various experimental additives was accomplished by a modified thermogravimetric analysis unit (TGA). The equipment used in such tests consisted of a Polymer Laboratories STA 1500 ® thermogravimetric unit coupled with a microcomputer. Generally speaking, approximately 10 milligrams of a given sample was loaded into a porcelien sample boat and heated under various conditions. $SO_x$ pick-up was normalized to the weight at the point where $SO_x$ gas commenced to be introduced. The composition of the $SO_2$ mix gas employed was usually 1000 ppm $SO_2$, 5% $CO_2$, 1% $O_2$, with the balance being nitrogen. These TGA tests, together with a series of experiments carried out in a large scale FCC pilot plant established the usefulness of applicant's bastnaesite/metal oxides (e.g., bastnaesite/spinel materials) in removing $SO_x$ from flue gas of a FCC regenerator and/or their ability to be "regenerated" for sustained use in FCC units. When considered in conjunction with various X-ray diffraction measurements, these TGA and pilot plant tests have led applicant to the conclusion that a chemical reaction has occurred between the bastnaesite and the spinel; and that, in the absence of this reaction, the otherwise very same ingredients would "age" or deactivate very rapidly with respect to their $SO_x$ absorbent/catalyst properties.

Before launching into a discussion of some of applicant's more important test results, it will be useful to better understand a few basic details concerning the most important reactions which are taking place. To this end, first consider the following chemical reactions:

(1) $SO_2 + \frac{1}{2}O_2 \rightarrow SO_3$ having rate R-1

(2) $SO_3 + MO \rightarrow MOSO_4$ having rate R-2

(3) $MoSO_4 + H \rightarrow MO + H_2S$ having rate R-3

Next, it should be noted that in evaluating these chemical reactions, applicant was most concerned with determining the relative reaction rates of these processes. In practice, reactions (1) and (2) occur, at rates R-1 and R-2 respectively, in a FCC regenerator. Reduction reaction (3) occurs at reaction rate R-3, in a FCC reactor. Reaction (1) is concerned with the conversion of sulfur dioxide to sulfur trioxide. Again, sulfur dioxide must be converted to sulfur trioxide before the sulfur content of a gas stream can be absorbed and removed from that stream. Reaction R-2 is mostly concerned with the absorbance of $SO_3$ once it is formed. Generally speaking, applicant found that the rate of reaction R-1, the rate of the surface catalyzed oxidation of $SO_2$ to $SO_3$, is the "controlling" reaction in the above-noted reaction series. For example, in studying these different reactions, applicant found the R-2 absorption rates are generally much faster than the R-1 catalysis reaction rate for the herein described materials (i.e., the absorption rate is much faster than the rate of surface catalyzed oxidation of $SO_2$ gas to $SO_3$ gas). In considering the details of these R-2 absorption reactions, applicant also usually found that the overall "holding capacity" of a given $SO_x$ absorbent material—rather than the rate at which the $SO_3$ gas reacts with that absorbent material—is the more important factor.

The third reaction rate R-3 involves reduction of the metal sulphate formed in the $SO_x$ absorbent material back to its metal oxide form (MO). Again, reaction (3) occurs in the FCC reactor—rather than in the FCC unit's regenerator unit. In any event, applicant has found that, if reaction R-3 is slow, this implies that a "permanent" metal sulphate is formed in the $SO_x$ catalyst. Consequently, the absorbent will decline in its ability to absorb $SO_x$—either through a loss of its ability to absorb $SO_3$ or its ability to convert $SO_2$ to $SO_3$.

As part of their overall experimental program, applicant also provided certain materials displaying a high rate of $SO_x$ absorption with a separate and distinct $SO_x$ catalyst (e.g., cerium, vanadium) which was known to be capable of giving a high rate of oxidation of $SO_2$ to $SO_3$ (e.g., they impregnated such materials with a cerium or vanadium ion-containing solution). For example, ceria particles or spinel particles impregnated with ceria, were employed for such purposes. Applicant usually found that, as long as a $SO_x$ catalysis rate (R-1) is kept high, even the less preferred $SO_x$ absorbents were able to capture a significant amount of the $SO_3$ (e.g., they captured more $SO_3$ than those captured by prior art and/or commercially available $SO_x$ absorbents).

FCC Pilot Plant Aging Studies

The FCC pilot plant employed by applicant consisted of a reactor, a stripper and a regenerator. Catalyst was continuously circulated between the reactor-stripper and the regenerator. In the reactor the circulating catalyst was contacted with a hydrocarbon feed stock. As a result of the reactions that occur on the surface of the catalyst, the so-called "cracking reaction", the catalyst becomes fouled with a deposit of "coke" which also contains a sulfur contaminant. The coked catalyst passes to a stripper where it is contacted with steam to remove entrained hydrocarbons. The stripped catalyst then flows to the regenerator where it is contacted with air to burn off the coke deposit in order to restore the catalyst activity. It is at this point that sulfur, which is part of the coke deposit, is burned to sulfur dioxide. As part of these experiments, the sulfur dioxide in the flue gas was continuously recorded by a $SO_x$ analyzer.

In a typical experiment conducted by applicant, a FCC pilot plant was first started up with a catalyst that did not contain any additive that will remove $SO_x$. After the unit operation had been stabilized and the $SO_x$ content of the flue gas had been established, the additive to be tested was injected into the circulating catalyst stream. The normal amount of additive used was one percent by weight of the catalyst in the circulating inventory. The $SO_x$ content of the flue gas was then monitored for a period of up to 48 hours. On the other hand, if the additive failed to remove the $SO_x$ in the flue gas, the experiment was terminated in a few hours. Typically after an experimental additive was tested, a standard additive of known performance was tested at the same conditions as the experimental additive. This was done since it was not always practical to use the same hydrocarbon feed stock or catalyst for every experiment.

Some typical pilot plant results are shown below:

TABLE I

| SAMPLE DESCRIPTION | $SO_x$ REMOVED, % wt |
|---|---|
| Ceria/Spinel | 90 |
| Chemically Heated Bastnaesite/Spinel | 92 |
| Ceria/Spinel | 80 |
| Physical Mixture of Bastnaesite/Spinel | 10 |

Suffice it to say that applicant repeatedly found that the $SO_x$ performance of the materials produced by the herein described processes is comparable to far more expensive $SO_x$ absorbent/catalyst materials such as ceria impregnated spinels. Applicant's chemically reacted bastnaesite/spinel materials also were much more effective $SO_x$ additives than physical mixtures of bastnaesite and spinel. This fact becomes apparent after running such bastnaesite/spinel mixtures through many absorption/regeneration cycles. In order to more fully study this effect, applicant ran a series of hereinafter described, large scale FCC pilot plant tests wherein a wide variety of $SO_x$ absorbent/catalysts materials were repeatedly used and regenerated.

By way of another method of presentation of this kind of pilot plant data, FIG. 5 depicts the comparative $SO_x$ absorption abilities of a ceria impregnated spinel versus a chemically reacted bastnaesite/spinel material which used the same spinel material. Both materials were repeatedly used and regenerated over a 40 hour period. Such tests are based upon $SO_x$ "emissions" which are expressed as the kilograms of $SO_x$ emitted per thousand barrels of fresh feed stock material processed in the FCC test unit. For example, the data shown in FIG. 5 indicates that the curve for one of applicant's chemically reacted bastnaesite/spinel materials (i.e., curve -----) always lies just above the curve for the ceria impregnated spinel (i.e., curve B Δ-Δ-Δ curve B) over the entire 40 hour time span of the test. This implies that applicant's $SO_x$ absorbent performed almost as well as the far more expensive, ceria impregnated spinel. It also should be noted in passing that the expression "Baseline Emissions 100 Kg/mbbl" given in FIG. 5 is the designation for a rather arbitrary, but widely used, industry standard meaning that, for comparative purposes, one would expect to get 100 kilograms of $SO_x$ per thousand barrels of feedstock if no $SO_x$ catalyst whatsoever were employed in the bulk FCC catalyst inventory.

Next, it should be noted that some of applicant's other experiments showed that bastnaesite, by itself, shows little sustained ability to absorb $SO_3$ after its first few passes through the FCC unit. For example, the material produced by the procedures of Example 7 (which are characterized by not having sufficient number of milliequivalents of mono-protonic acid) gave poor long term results. In effect, the materials produced acted as if they were physical mixtures of bastnaesite and spinels rather than chemically reacted bastnaesite/spinel materials. It also should be noted in passing that the data for the processes described in U.S. Pat. No. 4,311,581 ("the 581 patent"), tend to corroborate applicant's observations regarding bastnaesite's inability to be regenerated once it has formed a metal sulfate product with the $SO_3$ gas. For example, the 581 patent data shows that 15% by weight bastnaesite had to be in the bulk catalyst in order to give an 80% reduction in $SO_x$. This stands in sharp contrast to the additive described in Example 5 of this patent disclosure wherein an "average" of about 90% weight reduction in $SO_x$ was achieved through use of a bulk catalyst using only 1% by weight of one of applicant's chemically reacted bastnaesite/spinel $SO_x$ additives. Indeed, the $SO_x$ additive whose performance is depicted in curve A of FIG. 5 contained only 30% bastnaesite. Consequently, the concentration of bastnaesite in the bulk catalyst inventory was only 0.3% as compared to the 15% used in the process described in the 581 patent. This is a tremendous difference. Thus, taken together, these various test results show that while bastnaesite may have an excellent initial activity for removing $SO_x$, it ages very rapidly and it is only by using large amounts (e.g., 15%) that bastnaesite can be made to continuously remove $SO_x$ at acceptable rates for even relatively short periods of time. The X-ray diffraction data for the material produced by Example 7 also strongly indicated that the chemical interaction between the spinel and bastnaesite was minimal or even non-existent. Consequently, its bastnaesite component aged very rapidly and lost its ability to convert $SO_s$ to $SO_3$. Thus, the overall $SO_x$ removal efficiency for this material was quite poor.

XRD TESTS

The techniques of X-ray diffraction (XRD) are of course well known. Hence, for the purposes of this patent disclosure, it need only be briefly stated that the orderly, serried ranks of atoms in a crystalline lattice can be viewed at various angles in which files of atoms line up with a clear "avenue of sight" along certain cutting planes. That is to say that all crystals, in three dimensions, can be "viewed" from a standpoint of 3 different axes; and identification of such avenues can be made by counting atoms spaced from an arbitrary point of origin along each of the three axes. Such a plane can be identified by 3 designators e.g., A, B, C, or X, Y, Z, etc. having certain values 2, 5, 7, or 4,4,0 (which, incidentally would be abbreviated "440") etc. In conducting x-ray diffraction tests, a subject crystal is rotated until a plane is observed which permits X-rays of an appropriate wavelength to be diffracted by the lattice and, consequently, exhibit a detectable "peak" for such X-rays. The critical measurement for the x-ray diffraction peak plane is the angle of rotation of the crystal. In practice, because of certain mathematical relationships between these variables, such a peak is observed as an intensity ordinate plotted against an abscissa of 2 theta, the angle of rotation. Thus, such x-ray diffraction patterns can be thought of as exhibiting certain significant lines which correspond to the angle of rotation which is usually designated by the use of expressions such as interplanar spacing d(A) or 2-theta-d spacing or 2-theta (e) or simply a "2-theta value".

In any event, x-ray diffraction measurements of this type were made by applicant in order to test the degree to which desirable compounds (e.g., bastnaesite or bastnaesite derived compounds (e.g., $La_2O_3$) or "undesirable" compounds (free magnesium oxide) were associated with a given material's crystalline lattice structure. XRD tests also were used in trying to establish the exact molecular structure of the end product materials made by the processes of this patent disclosure. That is to say that various materials prepared by the processes of this patent disclosure were studied by X-ray diffraction, both in their own right and by comparison with other known production procedures and/or by comparison with certain $SO_x$ absorbent/catalyst materials obtained from commercial sources. XRD evidence of this kind tended to corroborate—but not conclusively prove—applicant's $La_2O_3$ transfer theory. For example, it was noted that a large shift in the XRD, two-theta value of various materials was created by the herein described processes. This shift seems to be due to a transfer of $La_2O_3$ to the lattice of the subject material's $R^{2+}O$ $R_2^{3+}O_3$ lattice system This hypothesis also seems to buttress the results that applicant obtained in his scanning electron microscope (SEM) experiments. In any case these experiments showed a significant amount of at least one rare earth element (e.g., La) which was originally found in the bastnaesite probably had made its way into the crystalline metal oxide component of the end product material.

Applicant's overall experimental program also established that if a starting Mg/Al ratio for a given spinel material is known, and the two-theta value for that material is known, then applicant could calculate the amount of "free magnesia" in the end product spinel component of the final product material. For example, applicant could relate the following cases:

TABLE II

| Starting Mg/Al | Two-Theta | Mg/Al XRD | Free MgO % wt |
|---|---|---|---|
| 1.0 | 65.2° | 0.5 | 18.7 |
| 1.0 | 64.5° | 1.0 | 0 |

In this example, a stoichiometric spinel was created which had a Mg/Al ratio in the spinel of 0.5. The resulting material had a very prominent free magnesia peak in its XRD pattern. On the basis of the knowledge that the starting Mg/Al ratio was 1.0, the free magnesia was calculated to be 18.7% by weight. In the second example of Table II, all of the magnesia was regarded as being in the spinel's crystalline lattice; hence, there was no "free" magnesia. Moreover, when applicant used bastnaesite with these Mg/Al materials, he obtained similar peaks for the spinel and free magnesia. They appear to be similar, for example: a typical material of this type gave the following XRD data.

| Mg/Al | Two-Theta | Mg/Al XRD | Free MgO % wt |
|---|---|---|---|
| 1.0 | 65.2° | 0.5 | 0 |

Thus, with a two-theta value of 65.2°, applicant anticipated a large free magnesia peak; however, the peak was essentially zero. Such findings constitutes very strong evidence that a new class of compounds (chemically reacted bastnaesite and spinel materials) have been produced by the herein described processes. This is to say that this data is strong evidence that the bastnaesite and spinel have chemically reacted with each other (as opposed to being only physically mixed with each other). Taking into account other kinds of experimental evidence, applicant's interpretation of such XRD data is that magnesia has reacted with a lanthanum oxide ($La_2O_3$) component of the bastnaesite to form a spinel-like component, $MgO \cdot La_2O_3$, in the resulting material. Applicant also tentatively concluded that the removal of the lanthanum oxide from the bastnaesite lattice has, in turn, most probably, made a cerium oxyfluoride component of the bastnaesite more accessible, and hence more able, to catalyze oxidation of sulfur dioxide to sulfur trioxide and to perform repeated cycles of $SO_x$ capture and regeneration.

One problem in dealing with this XRD data, however, is that certain peaks, such as free magnesia peaks, are not always zero. Moreover, with the bastnaesite in the overall material, applicant's calculation of the free magnesia became somewhat more tentative—especially when considering results between the two extremes show in Table II. In any event, applicant dealt with this problem by expressing the free magnesia as a ratio of the intensities of the spinel XRD peak to the free magnesia peak.

FIG. 1 shows the X-ray diffraction pattern for a spinel. However, the spinel, by design, was not a particularly good spinel; that is to say that it had a large amount of "free magnesia" and its spinel component itself was a stoichiometric spinel—the material that generated the patterns had a Mg/Al ratio equal to 1.0. In other words, it was exactly the type of spinel that the 979 patent tried to avoid.

Figure 2:
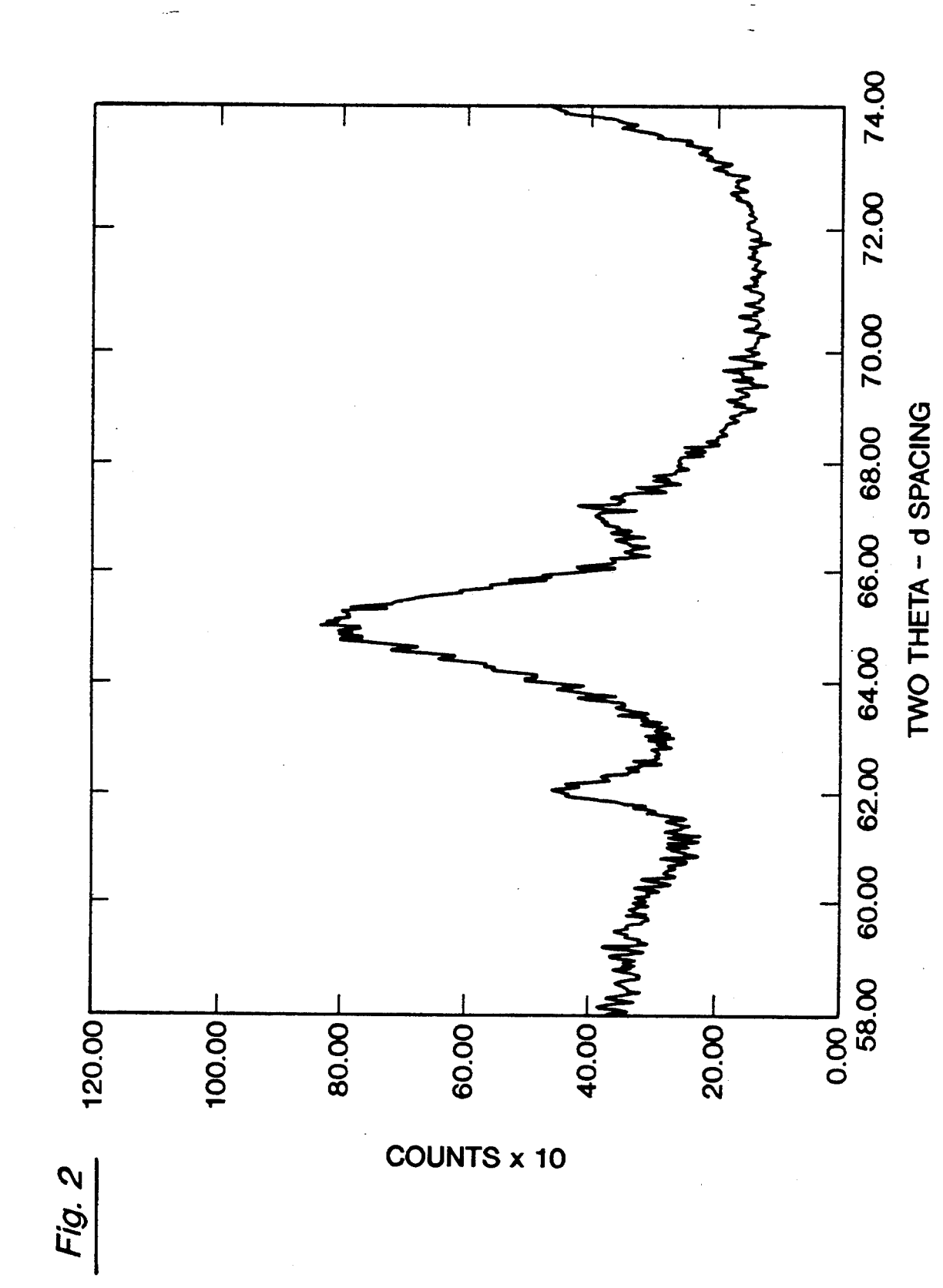

In any event, this XRD pattern is characterized by the presence of two distinct peaks—one at about 62.5 for magnesia and one at 65.2 for spinel. The ratio of the intensity of the spinel peak to the intensity of the magnesia peak is 1.5. By way of comparison, FIG. 2 depicts a XRD pattern for a spinel with a two-theta value of approximately 65.2. It was generated by a starting composition which also had a Mg/Al ratio of 1.0. However, the starting materials for the material whose XRD pattern is depicted in FIG. 2 differ in that they also were chemically reacted with bastnaesite according to the teachings of this patent disclosure. The difference in the magnesia peak intensity is very significant. The ratio of the intensity of the spinel peak to the intensity of the magnesia peak is, in this case, 6.5. That is to say that the free magnesia is demonstrably lower (note the intensity of the peak at 62.5); moreover, the position of the spinel has not shifted. Taken together these two facts indicate that a chemical reaction has occurred between the bastnaesite and the free magnesia which, according to FIG. 1, would otherwise be present. The most probable significance of the observation that the position of the spinel peak has not shifted implies that the free magnesia has not simply entered into the lattice structure of the spinel but rather, has chemically reacted with the bastnaesite. That is to say that if the free magnesia had gone into the spinel lattice, the two theta value of the spinel would have shifted from 65.2 to 64.4. This obviously has not happened. On other other hand, if the two theta value had shifted to 64.4 then that would have meant that the bastnaesite had not reacted with the spinel. Be this XRD data as it may, the fact that the bastnaesite has reacted with the magnesia only takes on its real significance to this patent disclosure when this XRD data is coupled with the fact that the bastnaesite is transformed into a regenerable catalyst for the oxidation of sulfur dioxide into sulfur trioxide and/or the absorption of $SO_3$.

Figure 3:
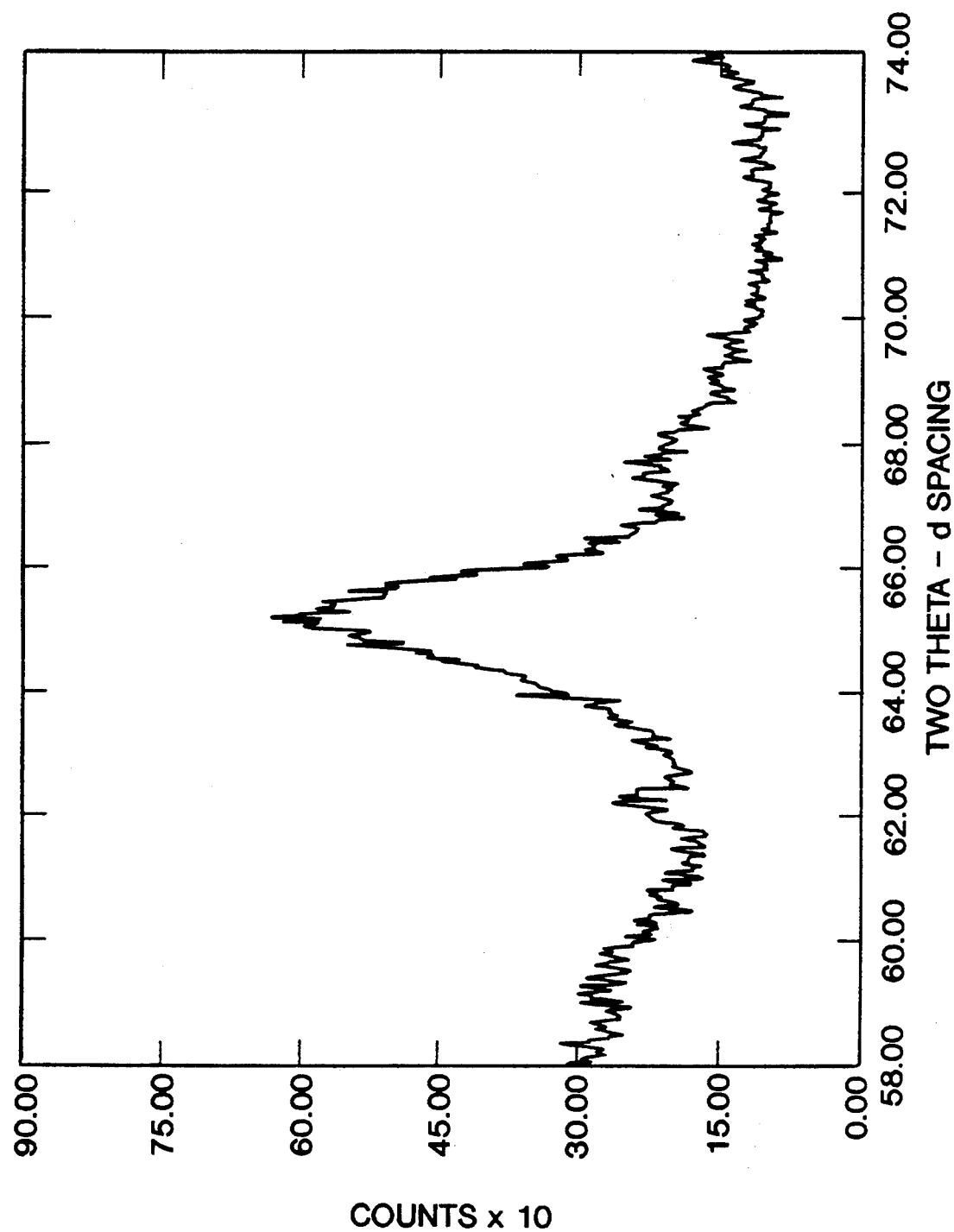
FIG. 3 is a XRD pattern for a bastnaesite/spinel material made with an alumina starting material having particles sized at 1000 nanometers.

FIG. 3 is a typical XRD pattern for a bastnaesite spinel made with Condea SB ® alumina. The plot tends to corroborate applicant's finding that excellent results were obtained when applicant used Condea SB ® alumina which has 1000 nanometer alumina particles. Again, this fact contrasts sharply with the requirements of the 979 patent for use of alumina particles sized at less than 5 nanometers. The magnesium peak is barely discernible and the spinel/magnesia intensity ratio is 13.3. This fact also tends to support applicant's contention that at least some magnesia is reacting with the bastnaesite. This evidence also suggests that, if the magnesia becomes too closely associated with the alumina as it does with the conditions emphasized in the 979 patent (wherein 2 nanometer particles are employed), then a chemical reaction does not occur between the spinel and the bastnaesite.

Figure 4:
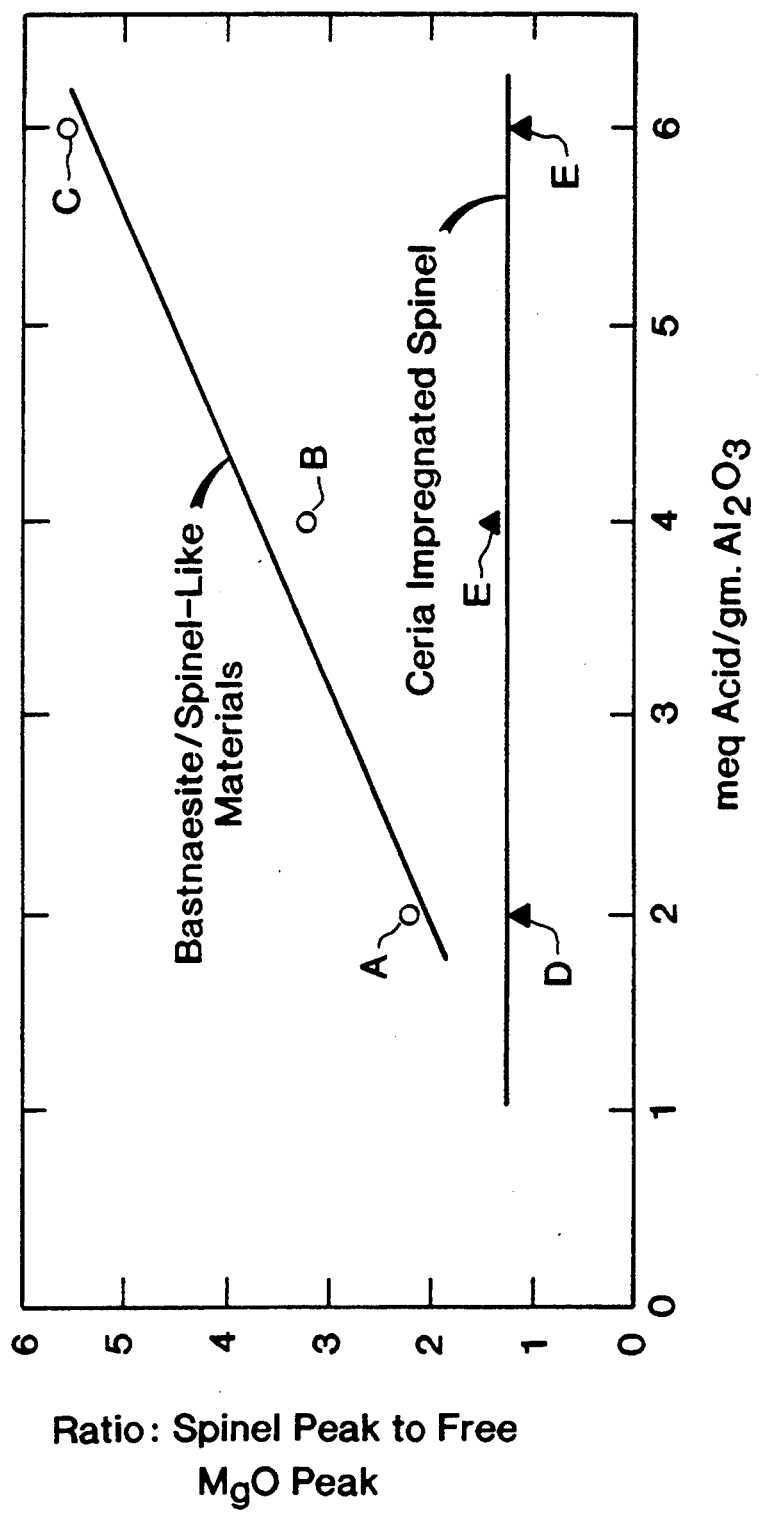
FIG. 4 is a plot of XRD intensity ratios for two preparations (a ceria impregnated spinel and a bastnaesite/spinel material) made with alumina sol ingredients prepared with differing amounts of milliequivalents of acid/gm of aluminum.

FIG. 4 is given to corroborate the fact that the milliequivalents of mono-protonic acid used in preparing the alumina sols of this patent disclosure is of paramount importance to the herein described processes. These milliequivalent parameters are expressed as the ordinate in the plot given in FIG. 4. The abscissa is the ratio of the spinel peak to the free magnesia peak. For example, in FIG. 1 this ratio is 1.5 and in FIG. 2 it is 6.5. The plot in FIG. 4 also, in effect, shows that with a ceriaspinel, there is no effect produced by changing the way the alumina is prepared relative to the amount of free magnesia in the $SO_x$ absorbent. This finding is in agreement with previous work by applicant and others that showed that the ceria does not interact with the spinel or the spinel ingredients. With applicant's use of bastnaesite, however, just the opposite is true. As the milliequivalents of acid used to prepare the alumina sol are raised, the amount of free magnesia goes down and, consequently, the ratio of spinel to free magnesia goes up. Again, this too is strong evidence that the bastnaesite is reacting with the magnesia in some way.

Applicant generally found that it is highly preferred to have the meqs of acid used in preparing an alumina sol above about four milliequivalents and most preferably in amounts providing about 5.0 milliequivalents of such acid(s). The data in FIG. 4 also serves to corroborate applicant's acid requirement parameters.

Other more specific variations on these processes also were established. For example, applicant found that by choosing the proper amount of meq of acid per gram of alumina in preparing certain alumina sols, the step of separately reacting bastnaesite with a Mg[A] compound such as magnesium hydroxyacetate can be completely eliminated. In any case, the more preferred composition ranges that applicant arrived at as "norms" for the herein described $SO_x$ catalysts which use of magnesia, alumina and a supplemental $SO_x$ catalyst (such as vanadium or ceria) are as follows:

TABLE III

|  | Low | Optional | High |
|---|---|---|---|
| Magnesia | 20 | 30 | 50 |

TABLE III-continued

| | Low | Optional | High |
|---|---|---|---|
| Alumina | 25 | 39 | 50 |
| Bastnaesite | 10 | 33 | 50 |
| Vanadia | 2 | 3 | 5 |
| Ceria | 0 | 6 | 15 |

Comparisons with Certain Prior Art Materials

Applicant conducted a great many tests aimed at comparing the bastnaesite/metal oxide materials (e.g., bastnaesite/spinel materials) produced by the methods of this patent disclosure with various prior art spinels and/or with bastnaesite alone and/or with various spinel-like or metal oxide materials alone with respect to their relative $SO_x$ absorbent/catalyst capabilities. These comparative tests were based upon laboratory TGA tests as well as large scale pilot plant tests. By way of example only, the results of some comparative, TGA tests are summarized in TABLE IV.

TABLE IV

| Sample Description | Two-Theta | TGA $SO_x$ Absorption, %/Min |
|---|---|---|
| Spinel | 64.9 | 0.083 |
| Spinel-Ceria | 64.8 | 0.21 |
| Bastnaesite Alone | — | 0.13 |
| Unreacted Bastnaesite And Spinel | 65.0 | 0.10 |
| Chemically Reacted Bastnaesite And Spinel | 65.2 | 0.16 |

Among other things, Table IV shows that the representative spinel test material, by itself, displays rather low activity with respect to $SO_x$ absorption (which is expressed in terms of a gain in weight of the test material per minute). That is to say that, relatively speaking, the 0,083 TGA value given in Table IV for the spinel indicates little $SO_x$ absorbance. However, the next line of Table IV shows that when an effective $SO_x$ catalyst (e.g., ceria) is added to that same spinel, there is a very significant increase in $SO_x$ absorption. In other words, the 0.21 TGA value represents a very significant increase in $SO_x$ absorption relative to the 0.083 value for the spinel alone. This kind of data was obtained for many a separate and distinct $SO_x$ catalyst such as ceria to different spinel or spinel-like metal oxide materials. This fact forced applicant to conclude that, without convert sulfur dioxide to sulfur trioxide, very little $SO_x$ is taken up by spinel (or spinel-like) materials because very little of the $SO_2$ is oxidized to $SO_3$ by a spinel alone. On the other hand, when the $SO_2$ is in fact converted to $SO_3$ (by the ceria), the spinel acts as a very good absorbent of the $SO_3$ gas which is produced. The only drawback to this state of affairs, is that the ceria used to effect the $SO_2$ oxidation is a rather expensive catalyst ingredient; moreover its presence in such a system also requires a separate (and costly) process step for removing the $NO_x$ formed in the flue gas during applicant's calcination step when ceria is present in the catalyst system.

Next, it should be noted that bastnaesite (as well as treated bastnaesite materials)—by itself has significant $SO_x$ absorption activity (in TGA tests), but only for the first cycle i.e., before "aging" becomes the factor that is only brought out by pilot plant tests which involve the repeated use and regeneration of the test material. Moreover, applicant's experimental programs (TGA as well as pilot plant) repeatedly confirmed that a mere mixing of bastnaesite materials with spinel or spinel-like materials results in only minor improvements in the $SO_x$ absorption ability of the resulting particle mixture. For example, Table IV shows a value of 0.10 for such a mixture. As further evidence that a particular material behaves as a mixture of bastnaesite and spinel (as opposed to a chemically reacted bastnaesite/spinel material), one can calculate the weighted average of the contribution of the bastnaesite and spinel and obtain a value which is in virtually exact agreement with that measured for a bastnaesite particle, spinel particle mixture. Again, all such unreacted materials showed very rapid aging in the FCC pilot plant tests. Applicant believes this is due to the rapid aging of the bastnaesite and the resulting loss of the $SO_x$ absorption function.

Be of this as it may, similar data was obtained for a wide variety of bastnaesite/metal oxide materials having different $R^{2+}$[A] and $R_2^{3+}$[B] components and/or different relative proportions thereof. However, applicant invariably found that when bastnaesite is chemically reacted with a metal oxide material very, very significant improvements are seen in the resulting bastnaesite/metal oxide material's ability to absorb $SO_x$. For example, the 0.16 TGA value for the chemically reacted bastnaesite-spinel material shown in Table IV is significantly higher than that of bastnaesite alone (even considered on a one time use basis—as opposed to repeated use in a pilot plant (as depicted in FIG. 5 of this patent disclosure), spinel alone or mere physical mixtures of bastnaesite and spinel. Indeed, the 0.16 value for the chemically reacted bastnaesite/spinel material is close to the 0.22 value achieved by the cerium impregnated spinel. Hence, this data shows that virtually the same high levels of $SO_x$ absorbance TGA values (e.g., 0.16 versus 0.22) can be achieved at far less expense owing to the fact that ceria is a far more expensive material than bastnaesite. It also bears repeating that in some of applicant's FCC pilot plant experiments, applicant's bastnaesite/spinel materials actually gave better results than many ceria-containing spinels.

Based upon this and a host of other experimental evidence, applicant has concluded that in the preparation of the bastnaesite/crystalline metal materials of the present patent disclosure i.e., those materials obtained when bastnaesite ingredient(s) is (are) chemically reacted with metal oxide ingredients, it is the occurrence of a chemical reaction between the bastnaesite and one or more metal oxides that creates $SO_x$ absorbent/catalyst materials which are very effective in their ability to convert sulfur dioxide to sulfur trioxide and, more importantly, in their ability to absorb the sulfur trioxide once it is formed—regardless of the means by which it is formed.

Applicant also verified that, in the case of certain materials which proved to be ineffective $SO_x$ additives, a chemical reaction does not occur between the bastnaesite and metal oxide ingredients. It also was established that even though applicant produced excellent spinel-like materials (some having the 64.6 two-theta value which were so prized under the teachings of the 979 patent), these "high quality" spinels were not as effective catalysts for converting sulfur dioxide to sulfur trioxide or for absorbing $SO_3$ relative to the bastnaesite/spinel materials of this patent disclosure—regardless of the "free" complex metal content of the present bastnaesite/spinel materials. However, it should be restated that these spinels when combined with ceria were excellent absorbents. Taken together, all of applicant's data imply that a chemical interaction has taken place between the bastnaesite (i.e., one or more of its constituent components) and at least one of the metal oxide components (e.g., MgO) of an overall crystalline metal oxide, and that it is the occurrence of this chemical reaction which enables the resulting bastnaesite/crystalline metal oxide material to act as both a better $SO_x$ catalyst and a superior $SO_x$ absorbent relative to its unreacted, constituent ingredients when they are used alone.

Next, attention again should be called to the fact that many of the spinel-like materials used in applicant's comparative experiments had a two-theta value of 65.2 which, under the criteria used in the 979 patent, would be considered poor spinels in terms of their $SO_x$ absorbent abilities. Indeed, under the teachings of the 979 patent, spinels displaying such XRD readings were those having unacceptably high complex compound concentrations e.g., those having too much "free" magnesium oxide. Very surprisingly, however, such 65.2 two-theta spinel materials still made excellent $SO_x$ absorption/catalyst materials when they were chemically reacted with bastnaesite. Applicant also verified that such 65.2 two-theta spinel materials made rather poor $SO_x$ absorbents when they were merely mixed with bastnaesite.

Those factors that made for "good spinels" in the 979 patent (i.e., those having 64.6 XRD two-theta values), make less active $SO_x$ additives when they are reacted with bastnaesite. Applicant's interpretation of this inconsistency with the teachings of the 979 patent is that if the $R^{2+}[A]$ and $R_2^{3+}[B]$ components (e.g., magnesia and alumina) are too closely associated during the initial reaction phase of preparation (by virtue of the small particle sizes called for in the 979 patent) they do not interact with the bastnaesite and that this positioning results in a material that behaves more like a physical mixture of, say, a spinel and a bastnaesite. Conversely, if such a chemical reaction does occur, the resulting vacancies in the bastnaesite lattice probably make a remaining cerium oxyfluoride (CeOF) component of the bastnaesite material more available to the sulfur dioxide reactants. However, examination of the X-ray diffraction patterns for several bastnaesite materials shows no "obvious" changes in the bastnaesite; nonetheless, applicant has used such methods in detecting very profound changes in the $R^{2+}O/R_2^{3+}+O_3$ components (e.g., in spinel components) of their resulting bastnaesite/metal oxide materials.

Relationship To Hydrocarbon Cracking catalysts

It also should be pointed out that applicant's thermogravimetric data and applicant's pilot plant data often complemented each other to give further insights into the nature of the chemical reactions under consideration. For example, in one set of comparative experiments, applicants' thermogravimetric data showed that bastnaesite, in and of itself, acts as a good $SO_x$ absorbent material—but only once (again see Table IV). That is to say that as bastnaesite is repeatedly used as an $SO_x$ absorbent and regenerated, its $SO_x$ absorbent abilities decrease dramatically. This effect was confirmed by applicant's pilot plant experiments which, by their very nature, were concerned with repeatedly using, regenerating and reusing a given $SO_x$ absorbent material. This effect also was observed when bastnaesite particles are merely physically mixed with hydrocarbon cracking particles (either mixed as separate and distinct particle species or mixed with hydrocarbon cracking catalysts to form composite hydrocarbon cracking/$SO_x$ absorbent particles). This pilot plant data explains the fact that, when bastnaesite is used as a $SO_x$ absorbent, large quantities of "make-up" bastnaesite must be continually added to the bulk catalyst of the FCC unit.

Applicant's comparative experimental program also established that many prior art hydrocarbon cracking catalysts which are commonly used in FCC units display some, albeit limited, ability to absorb $SO_x$. This is probably due to the widespread use of certain active forms of alumina in most FCC hydrocarbon cracking catalysts. However, this inability to absorb $SO_x$ generally follows from the fact that there are no catalyst materials in hydrocarbon cracking catalyst particles which are capable of converting sulfur dioxide to sulfur trioxide. In other words, many hydrocarbon cracking catalysts could also serve to absorb $SO_3$ if a catalyst for converting $SO_2$ to $SO_3$—such as that in applicant's bastnaesite/spinel materials—also were used in conjunction with the hydrocarbon cracking catalysts. Several experiments confirmed that this is indeed the case. When applicant's bastnaesite/metal oxide $SO_x$ absorbent materials were in fact added to such hydrocarbon cracking systems, it was found that a wide variety of FCC hydrocarbon cracking catalyst-bastnaesite/spinel systems (and especially bottoms cracking-bastnaesite/spinel systems) can then serve to absorb $SO_x$ as well as to perform their hydrocarbon cracking function if there is sufficient capability to catalyze the conversion of $SO_2$ to $SO_3$. Applicant's material performs this function particularly well and can form the basis of overall catalyst systems comprised of a major amount (e.g., 95–99% by weight) of a hydrocarbon cracking system and a minor amount (e.g., 1–5% by weight) of applicant's bastnaesite/spinel materials. It also should be noted that, in various FCC uses of applicant's bastnaesite/spinel materials, the separate and distinct presence of a $SO_x$ oxidation catalyst species (e.g., cerium particles or cerium impregnated particles) may be employed for the most economic utilization of all of the relevant materials. In any event, applicant found that his bastnaesite/metal oxides $SO_x$ additives can be associated with a wide variety of other catalysts—e.g., with ceria, oxidation catalysts, hydrocarbon cracking catalysts (and especially so-called "bottoms product" cracking catalysts). Applicant also found that the herein described bastnaesite/spinel materials can be associated (e.g., by inclusion in the total reaction mixture before it is subjected to spray drying or by mere mixing of applicant's bastnaesite/spinel materials with ceria impregnated spinel particles) with supplemental $SO_x$ catalysts such as ceria, vanadia, etc. which $SO_x$ oxidation capabilities. That is to say that such $SO_x$ catalysts (ceria, vanadia, etc.) are usually best added to a FCC unit as a separate particle species which is blended into the $SO_x$ additive, but they may be incorporated directly into the bastnaesite/spinel materials described in this patent disclosure.

A typical process for removing $SO_x$ from a fluid catalytic cracking regenerator (wherein hydrocarbon cracking catalyst particles which are contaminated by sulfur-containing coke), will comprise: (1) circulating a minor portion of a bastnaesite/spinel, $SO_x$ absorbent-catalyst with a major portion of a hydrocarbon cracking catalyst and wherein the bastnaesite/spinel, $SO_x$ absorbent/catalyst is further characterized by the fact that a bastnaesite component of the bastnaesite/spinel, $SO_x$ absorbent-catalyst is chemically reacted with a metal oxide component of said bastnaesite/spinel, $SO_x$ absorbent-catalyst.

Further variations of such process can involve preferred embodiments wherein the bastnaesite/spinel, $SO_x$ absorbent-catalyst is further characterized by: (1) being a particle which is made into a composite with separate and distinct $SO_x$ catalyst particles, (2) being particles which are impregnated with a separate and distinct $SO_x$ catalyst material selected from the group consisting of vanadium and cerium, (3) is used in particle admixture with bottoms-cracking particles.

Particularly Preferred Procedures and Preparations

Example 1

As part of their overall research program, applicant prepared many different magnesium solutions which were thereafter used in the production of many different spinels. One particularly preferred magnesium solution was formulated by adding 498 grams of glacial acetic acid to 554 milliliters of water. To the resulting mixture 167 grams of magnesium oxide (which was obtained from Combustion Engineering, Inc. in the form of their MAGOX ® product) was slowly added. The resulting mixture was then stirred until all of the magnesium oxide was dissolved.

Example 2

Another highly preferred form of magnesium solution was prepared by adding 249 grams of glacial acetic acid to 803 milliliters of water. To the resulting mixture, 167 grams of magnesium oxide (obtained from Combustion Engineering, Inc., in the form of their MAGOX ® product) was added. The mixture was then stirred for thirty minutes.

Example 3

Applicant also used magnesium oxide in slurry form. This was prepared by adding 167 grams of magnesium oxide (obtained from Combustion Engineering, Inc. in the form of their MAGOX ® product) to 1052 milliliters of water. The resulting slurry was mixed at high speed in a Waring blender.

Example 4

Some of applicant's most preferred alumina ingredients were those prepared by hydrolysis of aluminum alcoholates. The crystalline structure of these materials is best characterized as that of the mineral boehmite (alpha alumina monohydrate). However, within this broad definition there is a whole host of solid aluminas and sols that may be used in the preparation of these materials (spineis) with bastnaesite. Applicant has found that a particularly effective alumina is Condea P-3 ® (obtained from Condea Chemie GMBH of Germany). Applicant has also prepared spinels with Grade SB ® alumina (obtained from Condea Chemie GMBH). Other suitable aluminas similar to Grade SB are Catapal A ®, Catapal B ®, and Catapal C (which were each obtained from Vista Chemical Company). Within these general classes there also were several grades of dispersible alumina powders that already had the required amount of mono-protonic acid for dispersion mixed with the alumina. Hence, these materials were merely stirred with water to form alumina sols. By way of example, these aluminas are available as part of a class of aluminas called "Disperal Special Aluminas" ® from Condea Chemie GMBH of Germany, and as Dispal Alumina Sol from Vista Chemical Company. Another source of alpha alumina monohydrate having a crystalline structure and dispersibility similar to the above-noted commercial alumina products are the Versal Aluminas ® obtained from the La Roche Chemical Company. In passing applicant would also note that one particularly preferred way of preparing an alumina sol is to add 25 grams of glacial acetic acid to 1159 milliliters of water. To this mixture, 270 grams of Condea P-3 ® alumina powder was slowly added while stirring the mixture in a Waring blender. The mixture was stirred for twenty minutes.

Example 5

One particularly preferred bastnaesite used in the preparation of applicant's total reaction compositions was Grade 4000 ®, Grade 4010 ® and Grade 4100 ® obtained from Molycorp, Inc. Grade 4000 ® is a unleached bastnaesite mineral; by way of comparison, Grade 4010 ® represents a bastnaesite which has been leached to remove alkaline earth metals; Grade 4100 has been both leached and calcined. Of these materials the Grade 4100 is somewhat preferred. It was prepared by slurrying it to 50% weight slurry and milling it to 2.0 microns in a sand mill.

Preparation Of Certain Preferred Bastnaesite/Spinel Total Reaction Mixtures

Example 6

To 2154 grams of alumina sol (as described in Example 4), was added 846 grams of magnesium acetate (as described in Example 1). The mixture was then stirred at high speed. To the resulting mixture 846 grams of magnesium oxide slurry prepared by the procedure in Example 3 was added. A slurry of bastnaesite (prepared as in Example 5) was added to the mixture. The resulting slurry was spray dried and then calcined for one hour at 1350° F. The X-ray diffraction pattern for this material showed a two-theta value of 65.2. The ratio of spinel to magnesia was 6.5. Evaluation of this material on the TGA test showed an absorption of 0.16%/min..

Example 7

An alumina sol was prepared by dispersing 204 grams of Condea P-3 ® powder in an acetic acid solution containing 8.5 grams of glacial acetic acid in 884 milliliters of water. To this sol, 814 grams of magnesia hydroxy acetate (prepared as in Example 2) was added. The resulting mixture was stirred at high speed. To this mixture, 206 grams of Molycorp Grade 4100 ® bastnaesite (prepared according to Example 5) were added and stirred at high speed. The resulting slurry was spray dried and then calcined for one hour at 1350° F. The X-ray diffraction pattern for this material showed a two-theta value of 64.6. The ratio of spinel to magnesia was 1.9. Evaluation of this material on the TGA showed an absorption of 0.10%/min.

Example 8

An alumina sol was prepared by dispersing 204 grams of Condea SB ® alumina in an acetic acid solution containing 9.2 grams of glacial acetic acid in 982 milliliters of water. To this sol, 869 grams of magnesia hydroxyacetate (prepared as in Example 2) were added. The resulting mixture was stirred at high speed. To this mixture, 221 grams of Molycorp Grade 4100 bastnaesite (prepared according to Example 5) were added and stirred at high speed. The resulting slurry was spray dried and then calcined for one hour at 1350° F. The X-ray diffraction pattern for this material showed a two-theta value of 65.14. The ratio of spinel to magnesia was 4.3. Evaluation of this material on the TGA showed an absorption of 0.16%/min.

Example 9

A magnesia solution containing 13% weight magnesia was prepared by slurrying 119 grams of magnesia in 666 milliliters of water. To this slurry were added 84 grams of glacial acetic acid. The resulting slurry was added to 1150 grams of alumina sol prepared by the same formulation taught in Example 7. The mixture was stirred at high speed. To the mixture, 221 grams of Molycorp Grade 4100® bastnaesite (prepared as in Example 5) were added and stirred at high speed. The resulting slurry was spray dried and then calcined for one hour at 1350° F. The X-ray diffraction pattern for the resulting material showed a two-theta value of 65.04. The ratio of spinel to magnesia was 3.7. Evaluation on this material on the TGA showed an absorption of 0.17%/min.

Example 10

An alumina sol was prepared by dispersing 142 grams of Condea P-3® alumina powder in a solution of 2.9 grams of 70% weight nitric acid in 718 milliliters of water. A solution containing magnesium nitrate was prepared by dissolving 41 grams of magnesia in 174 grams of 70% nitric acid in 154 milliliters of water. This solution was added to the alumina sol and stirred at high speed. A slurry of magnesia in water was prepared by adding 41 grams of magnesia powder to 167 milliliters of water. This was added to the alumina and magnesium nitrate mixture. To this was added 153 grams of Molycorp Grade 4100® bastnaesite prepared according to Example 5. The resulting slurry was spray dried and then calcined for one hour at 1350° F. The X-ray diffraction pattern for the resulting material showed a two-theta value of 64.94. The ratio of spinel to magnesia was 3.9. Evaluation of this material on the TGA showed an absorption of 0.15%/min.

Example 11

An alumina sol was prepared by dispersing 132 grams of Condea SB® alumina in a nitric acid solution containing 8.9 grams of 70% weight nitric acid in 539 milliliters of water. To this sol 390 grams of a magnesium nitrate solution were added; the magnesia ocntent of the solution was 20% weight. The resulting mixture was stirred at high speed. To this mixture 72.8 grams Molycorp Grade 4100® bastnaesite (prepared according to the procedure in Example 5) were added and stirred at high speed. The resulting slurry was spray dried and then calcined for one hour at 1350° F. The X-ray diffraction pattern for this material showed a 2-theta value of 65.13. The ratio of the spinel to magnesia was 13.3. Evaluation of this material on the TGA showed an absorption of 0.16%/min.

Example 12

An alumina sol was prepared by dispersing 188 grams of Condea P-3® powder in an acetic acid solution containing 8.5 grams of glacial acetic acid in 840 milliliters of water. To this sol 584 grams of magnesium hydroxy acetate prepared according to the procedure in Example 2 were added. The resulting mixture was stirred at high speed. A mixture of 102 grams of Molycorp Grade 4100® bastnaesite (prepared according to the procedure in Example 5), and 288 grams of magnesium hydroxy acetate were added to the mixture of alumina sol and magnesium hydroxy acetate and stirred at high speed. The bastnaesite and magnesium hydroxy acetate had been previously prepared and aged for one hour. The final slurry was spray dried and then calcined for one hour at 135° F. The X-ray diffraction pattern for this material showed a 2-theta value of 64.82. The ratio of spinel to magnesia was 6.7. Evaluation of this material on the TGA showed an absorption of 0.13%/min.

Example 13

An alumina sol was prepared following the procedure in Example 4. To 431 grams of this sol were added 338 grams of magnesium hydroxy acetate prepared according to the procedure in Example 2. The resulting mixture was stirred to produce a uniform gel. This material was dried at 500° F. in a muffle and then calcined for one hour at 1350° F. The X-ray diffraction pattern for this material showed a 2-theta value of 64.93. The ratio of spinel to alumina was 2.0. Evaluation of this material on the TGA showed an absorption of 0.08%/min.

Example 14

An alumina sol was prepared following the procedure in Example 4. To 379 grams of this sol were added 298 grams of magnesium hydroxy acetate prepared according to the procedure in Example 2. The resulting mixture was stirred to produce a uniform gel. To this gel 44.4 grams of Molycorp Grade 5370 Cerium Nitrate were added and stirred to produce a uniform mixture. This material was dried at 500° F. in a muffle and then calcined for one hour at 1350° F. The X-ray diffraction pattern for this material showed a 2-theta value of 64.77. The ratio of spinel to magnesia as 2.6. Evaluation of this material on the TGA showed an absorption of 0.21%/min.

Example 15

One of applicant's secondary criteria of "excellence" in a given material was the amount of complex metal produced in a given bastnaesite/metal oxide material. In order to make such determinations, the starting compositions of various $R^+/R_2^{3+}$ metal oxide materials were fixed at an atomic ratio of 1.0. This was done simply by maintaining the ingredient composition of metal oxide-forming ingredients at prescribed levels (e.g., 55.9% by weight $Al_2O_3$ and 44.1% by weight MgO in order to produce a desired Mg/Al atomic ratio of 1.0) so that "acid equivalence" became the variable responsible for any observed differences in the character of any resulting bastnaesite/metal oxide material. The results of these tests showed that the herein described processes showed that the acid milliequivalency range was 1.0 to 10.0 with a 5.0 milliequivalency being especially preferred for an Mg/Al atomic ratio of 1.0.

Thus, while applicant's invention has been described with respect to various scientific theories, specific examples and a spirit which is committed to the concept of the occurrence of a chemical reaction between the bastnaesite and one or more metal oxide materials, it is to be understood that this invention is not limited thereto; but rather only should be limited by the scope of the following claims.

Thus having described my invention, what is claimed is:

1. A process for reacting a bastnaesite material with a magnesium A, aluminum B material in order to form a bastnaesite/magnesium oxide/aluminum oxide product, said process comprising: (1) dispersing an aluminum B compound in a liquid media which also contains between about 1.0 and about 10.0 milliequivalents of a mono-protonic acid per gram of aluminum in the aluminum B sol material; (2) mixing a magnesium A compound with the aluminum B sol material and thereby creating a magnesium A/aluminum B gel composition; (3) mixing the bastnaesite material with the magnesium A/aluminum B gel composition and thereby creating a bastnaesite/magnesium A/aluminum B total reaction composition; (4) spray drying the bastnaesite/magnesium A/aluminum B total reaction composition to produce a solid solution material and (5) calcining the solid solution material to produce a bastnaesite/magnesium oxide/aluminum oxide product wherein at least a component of the bastnaesite and at least one metal oxide are chemically reacted with each other.

2. The process of claim 1 wherein an A anion of the magnesium A compound is selected from the group of anions consisting of acetate, hydroxyacetate, nitrate, hydroxynitrate, oxide, ethylate and ethoxide.

3. The process of claim 1 wherein a B anion of the aluminum B compound is selected from the group of anions consisting of acetate, hydroxyacetate, nitrate, oxide, hydroxide and hydroxynitrate.

4. The process of claim 1 wherein the magnesium A compound is magnesia and the aluminum B compound is alumina.

5. The process of claim 1 wherein the mono-protonic acid is selected from the group consisting of nitric acid, acetic acid and formic acid.

6. The process of claim 1 wherein about 5.0 milliequivalents of the mono-protonic acid per gram of aluminum in the aluminum B compound are employed.

7. The process of claim 1 which further comprises desiccating the solid solution material resulting from the spray drying at a desiccation temperature higher than the boiling point of the liquid medium for a period from about 0.2 hours to about 24.0 hours.

8. The process of claim 1 wherein the calcining is carried out in a temperature range between about 1,000 degrees Fahrenheit and about 1,950 degrees Fahrenheit for from about 60 minutes to about 240 minutes.

9. The process of claim 1 wherein a gas evolution agent is added to the total reaction composition before said composition undergoes spray drying.

10. The process of claim 1 wherein a viscosity agent selected from the group consisting of starch and gum arabic is added to the total reaction composition before said composition undergoes spray drying.

11. The process of claim 1 wherein the bastnaesite constitutes from about 5 to about 50 weight percent of the bastnaesite/magnesium oxide/aluminum oxide product.

12. The process of claim 1 wherein an additional $SO_x$ catalyst material is combined with the total reaction composition.

13. The process of claim 1 wherein an additional $SO_x$ a ceria, $SO_x$ catalyst material is selected from the group consisting of cerium and vanadium combined with the total reaction composition.

14. The process of claim 1 wherein the bastnaesite/magnesium oxide/aluminum oxide product is impregnated with a $SO_x$ catalyst.

15. The process of claim 1 wherein the bastnaesite/magnesium oxide/aluminum oxide product is impregnated with a ceria $SO_x$ catalyst.

16. The process of claim 1 wherein a hydrocarbon cracking catalyst is combined with the bastnaesite/magnesium oxide/aluminum oxide product by use of a catalyst binder material which binds hydrocarbon cracking catalyst particles to bastnaesite/magnesium oxide/aluminum oxide particles in order to produce a composite particle.

17. The process of claim 1 wherein the component of the bastnaesite which reacts with the metal oxide is a $La_2O_3$ component of the bastnaesite material.

18. The process of claim 1 wherein the component of the bastnaesite which reacts with the metal oxide is a $La_2O_3$ component which becomes a part of a crystalline structure of a spinel metal oxide component of a bastnaesite/spinel product of said process.

19. A process for reacting a bastnaesite material with a magnesium A, aluminum B material in order to form a bastnaesite/magnesium oxide/aluminum oxide product, said process comprising: (1) dispersing an aluminum B compound in a liquid media which also contains between about 1.0 and about 10.0 milliequivalents of a mono-protonic acid per gram of aluminum in the aluminum B sol material; (2) mixing a first portion of a magnesium A compound with the bastnaesite material to produce a bastnaesite/magnesium A material and allowing said bastnaesite/magnesium A material to age; (3) mixing a second portion of the magnesium A compound with the aluminum B sol material and thereby creating a magnesium A/aluminum B gel composition; (4) mixing the bastnaesite/magnesium A material with the magnesium A/aluminum B gel composition to create a bastnaesite/magnesium A aluminum B total reaction composition; (5) spray drying the bastnaesite/magnesium A/aluminum B total reaction composition in order to produce a solid solution material and (6) calcining the solid solution material to produce a bastnaesite/magnesium oxide/aluminum oxide product wherein at least a component of the bastnaesite and at least one metal oxide are chemically reacted with one another.

20. The process of claim 19 wherein the bastnaesite/magnesium A material is aged for about one hour.

21. The process of claim 19 wherein a A anion of the magnesium A compound is selected from the group of antions consisting of acetate, hydroxyacetate, nitrate, hydroxynitrate, oxide, ethylate and ethoxide.

22. The process of claim 19 wherein a B anion of the aluminum B compound is selected from the group of anions consisting of acetate, hydroxyacetate, nitrate, oxide, hydroxide and hydroxynitrate.

23. The process of claim 19 wherein the magnesium A compound is magnesia and the aluminum B compound is alumina 24. The process of claim 19 wherein the mono-protonic acid is selected from the group consisting of nitric acid, hydrochloric acid, acetic acid and formic acid.

25. The process of claim 19 wherein about 5.0 milliequivalents of the mono-protonic acid per gram of aluminum in the aluminum B compound are employed.

26. The process of claim 19 which further comprises desiccating the solid solution material resulting from the spray drying at a temperature higher than the boiling point of the liquid medium for a period from about 0.2 hours to about 24.0.

27. The process of claim 19 wherein the calcining is carried out in a temperature range between about 1,000 degrees Fahrenheit and about 1,950 degrees Fahrenheit for from about 60 minutes to about 240 minutes.

28. The process of claim 19 wherein a gas evolution agent is added to the total reaction composition before said composition undergoes spray drying.

29. The process of claim 19 wherein a viscosity agent selected from the group consisting of starch and gum arabic is added to the total reaction composition before said composition undergoes spray drying.

30. The process of claim 19 wherein the bastnaesite constitutes from about 5 to about 50 weight percent of the bastnaesite/metal oxide product.

31. The process of claim 19 wherein an additional $SO_x$ catalyst material is combined with the total reaction composition.

32. The process of claim 19 wherein an additional $SO_x$ catalyst material selected from the group consisting of cerium and vanadium is combined with the total reaction composition.

33. The process of claim 19 wherein the bastnaesite/magnesium oxide/aluminum oxide material is impregnated with a $SO_x$ catalyst.

34. The process of claim 19 wherein the bastnaesite/magnesium oxide/aluminum oxide product is impregnated with a ceria, $SO_x$ catalyst.

35. The process of claim 19 wherein a hydrocarbon cracking catalyst is combined with the bastnaesite/magnesium oxide/aluminum oxide product by use of a catalyst binder material which binds hydrocarbon cracking catalyst particles to bastnaesite/magnesium oxide/aluminum oxide product particles in a composite particle.

36. The process of claim 19 wherein the component of the bastnaesite which reacts with the metal oxide is a $La_2O_3$ component of the bastnaesite material.

37. The process of claim 19 wherein the component of the bastnaesite which reacts with the metal oxide is a $La_2O_3$ component which becomes a part of a crystalline structure of a spinel-like metal oxide component of a bastnaesite/spinel product of said process.

38. A compound comprised of bastnaesite which is chemically reacted with a metal oxide material to form a resulting bastnaesite/spinel compound.

39. A bastnaesite/spinel compound of claim 38 wherein a $La_2O_3$ component of a bastnaesite component of the bastnaesite/spinel compound is transferred to a metal oxide component of said bastnaesite/spinel compound.

40. A bastnaesite/spinel compound of claim 38 wherein a free magnesia compound of a spinel is chemically reacted with the bastnaesite material.

41. A bastnaesite/spinel compound of claim 38 made in particulate form suitable for use in a fluid catalytic cracking unit.

42. A bastnaesite/spinel compound of claim 38 wherein a metal oxide component of said bastnaesite/spinel compound is a magnesium oxide compound.

43. A bastnaesite/spinel compound of claim 38 wherein a metal oxide component of said bastnaesite/metal oxide compound is a magnesium/alumina spinel.

44. A bastnaesite/spinel compound of claim 38 wherein the bastnaesite constitutes from about 5 to about 50 weight percent of said compound.

45. A bastnaesite/spinel compound of claim 38 which further comprises an additional $SO_x$ catalyst material which is combined with the bastnaesite/spinel.

46. A bastnaesite/spinel compound of claim 38 which further comprises a hydrocarbon cracking catalyst which is combined with the bastnaesite/spinel by use of a catalyst binder material which binds hydrocarbon cracking catalyst particles to bastnaesite/spinel particles in a composite particle.

* * * * *